(12) United States Patent
Tamaizumi

(10) Patent No.: US 8,160,777 B2
(45) Date of Patent: Apr. 17, 2012

(54) ELECTRIC POWER STEERING DEVICE

(75) Inventor: Terutaka Tamaizumi, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 777 days.

(21) Appl. No.: 12/273,881

(22) Filed: Nov. 19, 2008

(65) Prior Publication Data

US 2009/0132126 A1 May 21, 2009

(51) Int. Cl.
*H02P 21/00* (2006.01)

(52) U.S. Cl. ............... 701/42; 318/400.02; 318/799; 180/446; 180/422

(58) Field of Classification Search ............ 701/42, 701/43; 318/400.02, 400.03, 400.27, 434, 318/437, 446, 563, 466, 467, 606, 746, 747, 318/768, 780, 799; 180/421, 422, 443, 446
See application file for complete search history.

(56) References Cited

U.S. PATENT DOCUMENTS

| | | | |
|---|---|---|---|
| 6,720,749 B2 * | 4/2004 | Ta et al. ............... | 318/434 |
| 7,126,368 B2 * | 10/2006 | Paulson et al. ........... | 324/765.01 |
| 7,199,538 B2 * | 4/2007 | Kameya ................ | 318/400.05 |
| 2004/0133323 A1 * | 7/2004 | Kodama et al. .......... | 701/41 |
| 2005/0093499 A1 * | 5/2005 | Gallagher et al. ......... | 318/495 |
| 2005/0174083 A1 * | 8/2005 | Sato .................. | 318/565 |
| 2005/0258791 A1 * | 11/2005 | Iwami et al. ............ | 318/432 |
| 2007/0176577 A1 * | 8/2007 | Kezobo et al. ........... | 318/807 |
| 2008/0067960 A1 * | 3/2008 | Maeda et al. ........... | 318/400.02 |
| 2008/0167780 A1 | 7/2008 | Suzuki et al. | |
| 2008/0217096 A1 | 9/2008 | Suzuki et al. | |
| 2008/0315809 A1 | 12/2008 | Tamaizumi | |

FOREIGN PATENT DOCUMENTS

| | | |
|---|---|---|
| EP | 1 527 978 A2 | 5/2005 |
| EP | 1 527 978 A3 | 5/2005 |
| EP | 1 737 116 A1 | 12/2006 |
| EP | 1 961 644 A2 | 8/2008 |
| EP | 1 961 644 A3 | 8/2008 |
| JP | 2003-26020 | 1/2003 |
| JP | 2006-50721 | 2/2006 |

OTHER PUBLICATIONS

U.S. Appl. No. 12/260,472, filed Oct. 29, 2008, Tamaizumi et al.
U.S. Appl. No. 12/354,401, filed Jan. 15, 2009, Nozawa.
U.S. Appl. No. 12/355,118, filed Jan. 16, 2009, Nozawa, et al.
U.S. Appl. No. 12/435,046, filed May 4, 2009, Tamaizumi, et al.

* cited by examiner

*Primary Examiner* — Thomas Black
*Assistant Examiner* — Ce Li
(74) *Attorney, Agent, or Firm* — Oblon, Spivak, McClelland, Maier & Neustadt, L.L.P.

(57) ABSTRACT

When an electrification failure occurs in any of the phase of a motor, a control device of an electric power steering device executes current control for generating, in each of two electrification phases other than a phase with the electrification failure, a phase current that changes in the form of a secant curve or a cosecant curve based on an asymptotic line, which is a predetermined rotational angle corresponding to the phase with the electrification failure, to thereby continuously output a motor control signal. The control device of the electric power steering device executes current restriction for restricting the phase current within a predetermined range. The control device of the electric power steering device further executes control for accelerating rotation of the motor during two phase drive, in order to prevent the occurrence of a stuck steering wheel during low-speed steering, which is caused as a result of the execution of the current restriction.

11 Claims, 15 Drawing Sheets

ELECTRIC POWER STEERING DEVICE

INCORPORATION BY REFERENCE

The disclosure of Japanese Patent Application No. 2007-300667 filed on Nov. 20, 2007 including the specification, drawings and abstract is incorporated herein by reference in its entirety.

BACKGROUND OF THE INVENTION

1. Field of the Invention

This invention relates to an electric power steering device.

2. Description of the Related Art

Many of the motor control devices that are used in electric power steering devices (EPS) and the like are provided with abnormality detecting means for detecting an abnormality when an electrification failure occurs in any of a three-phase motor (any of U, V and W phases) due to disconnection of a power supply line or a contact failure of a drive circuit. Upon detection of the abnormality, these motor control devices stop the motor control promptly to attain fail safe.

However, the steering characteristics of the EPS change significantly due to the discontinuation of the motor control. In other words, a greater steering force is required for the driver to perform accurate steering operation. There is a motor control device in which even when a phase with an electrification failure is detected, motor control is continued with the other two electrification phases (see Japanese Patent Application Publication No. 2003-26020 (JP-A-2003-26020), for example). With this device, an assist power can be continuously applied to the steering system to avoid an increase of burden that is imposed on a driver when attaining fail safe.

However, in the case described above in which an electrification failure occurs in a phase and therefore the motor control is continued with the other two electrification phases, deterioration of steering feeling occurs inevitably due to the occurrence of a torque ripple, in a configuration where a sinusoidal waveform current is applied to each electrification phase, as shown in FIG. 20 (in the illustrated example, the U phase is abnormal, and V and W phases are electrified).

Specifically, as shown in the d/q coordinate system of FIG. 21 which shows how the currents change when the two phases of the motor are driven, the actual q-axis current value changes sinusoidaly, in spite of the constant q-axis current command value, which is a control target value of a motor torque. In other words, because a motor current corresponding to a requested torque is not generated, the motor is continuously driven without delivering its true output performance, causing a significant change in the assist power of the motor. This problem leaves room for improvement.

SUMMARY OF THE INVENTION

This invention provides an electric power steering device that stably applies an assist power by facilitating rotation of a motor when two phases thereof are driven due to an electrification failure. The invention also provides a method for controlling the electric power steering device.

A first aspect of the invention is an electric power steering device, which has: a steering force assisting device having a motor that functions as a drive source and providing a steering system with an assist power for assisting a steering operation; and a control device that controls an operation of the steering force assisting device through a supply of a drive power to the motor, the control device having: a motor control signal output part that outputs a motor control signal; a drive circuit that supplies the drive power of three phases to the motor on the basis of the motor control signal; and an abnormality detecting part that detects an electrification failure caused in each of the phases of the motor, wherein: the motor control signal output part generates the motor control signal by executing current control on the basis of a rotational angle of the motor and, upon occurrence of the electrification failure, executes output of the motor control signal by means of two electrification phases other than a phase with the electrification failure; upon occurrence of the electrification failure, the motor control signal output part executes the current control for applying each of the electrification phases with a phase current that changes in the form of a secant curve or a cosecant curve based on an asymptotic line, which is a line on which a predetermined rotational angle corresponding to the phase with the electrification failure is constant; the motor control signal output part executes current restriction for restricting the phase current within a predetermined range; and the motor control signal output part executes acceleration control for accelerating rotation of the motor, in order to prevent the rotation of the motor from stopping as a result of the current restriction.

According to the above configuration, except for the predetermined angle corresponding to the asymptotic line (a current restriction range in the vicinity of the predetermined rotational angle, when the value of the phase current applied to each phase has a limit), a motor current corresponding to a requested torque can be generated. As a result, even when the electrification failure occurs, the motor can be driven continuously while maintaining the high output performance, without generating a significant torque ripple.

When the motor control is essentially performed by applying the abovementioned phase current that changes in the form of a secant curve or a cosecant curve, theoretically, (the absolute value of) the phase current value needs to be increased to infinity in the vicinity of the predetermined rotational angle in order to generate a constant motor torque. Therefore, when the current restriction is executed in the vicinity of the predetermined rotational angle, the generated motor torque (assist torque) falls below an assist power target value in the current restriction range. As a result, due to the fact that the torque in the steering direction (the sum of the steering torque and the assist torque) falls below a reaction torque in a return direction (axial force) in the vicinity of the predetermined rotational angle, a section where the steering speed decreases appears; which might interfere with smooth motor rotation. Particularly during low-speed steering where the rotational angular velocity of the motor is equal to or lower than critical velocity required to pass the deceleration section, the motor stops rotating when the torque in the steering direction and the reaction torque (axial force) in the return direction are balanced. Such a phenomenon might cause a so-called stuck steering wheel.

However, execution of the acceleration control of the above configuration can increase the rotational angular velocity of the motor to prevent the occurrence of the stuck steering wheel. As a result, even during low-speed steering, smooth motor rotation can be achieved and a stable assist power can be provided.

This invention can provide an electric power steering device that stably applies an assist power by facilitating rotation of a motor when two phases thereof are driven due to an electrification failure. The invention can also provide a method for controlling the electric power steering device.

BRIEF DESCRIPTION OF THE DRAWINGS

The foregoing and further features and advantages of the invention will become apparent from the following descrip

DETAILED DESCRIPTION OF EMBODIMENTS

An electric power steering device (EPS) according to a first embodiment of the invention is described hereinafter with reference to the drawings.

Figure 1:
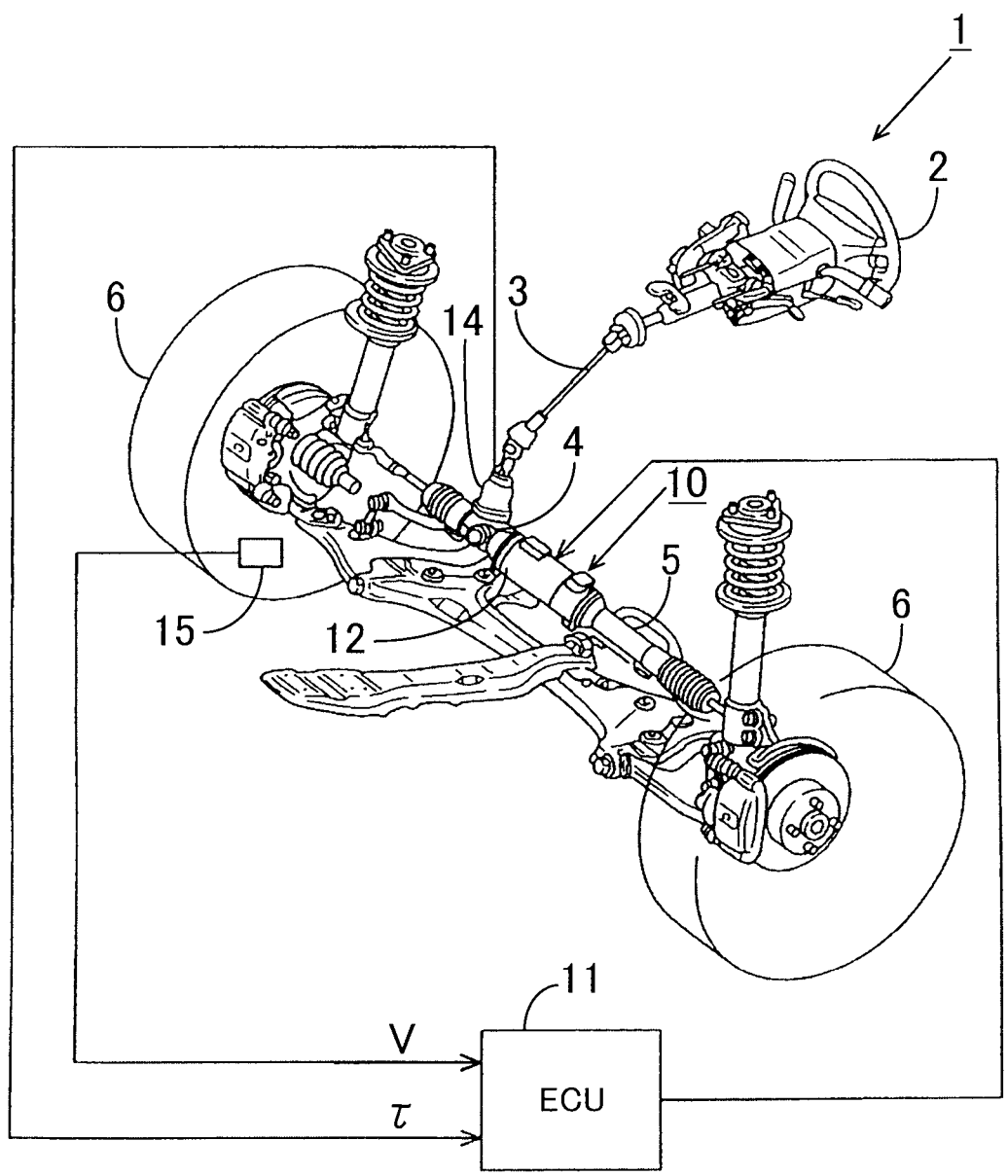
- FIG. 1 is a schematic configuration diagram of an electric power steering device (EPS)

FIG. 1 is a schematic configuration diagram of an EPS 1 according to the first embodiment of the invention. As shown in the diagram, a steering shaft 3 connected to a steering wheel (steering) 2 is connected to a rack 5 via a rack-and-pinion mechanism 4. When steering is performed, the rotation of the steering shaft 3 is converted into a linear motion of the rack 5 by the rack-and-pinion mechanism 4. Then, the rudder angle of turning wheels 6 is changed by the linear motion of the rack 5.

The EPS 1 has an EPS actuator 10 which functions as a steering force assisting device for applying an assist power to a steering system to assist its steering operation, and an electrical control unit (ECU) 11 for controlling actuation of the EPS actuator 10.

The EPS actuator 10 is a so-called rack-type EPS actuator, in which a motor 12 serving as a drive source is arranged coaxially with the rack 5. In the EPS actuator 10, an assist torque generated by the motor 12 is transmitted to the rack 5 via a ball screw mechanism (not shown). The motor 12 is a brushless motor, and is rotated by a three-phase (U, V and W) drive power supplied from the ECU 11. The ECU 11 serving as a motor control device controls the assist power applied to the steering system, by controlling the assist torque generated by the motor 12 (power assist control).

In this embodiment, a torque sensor 14 and a vehicle speed sensor 15 are connected to the ECU 11. The ECU 11 executes the actuation of the EPS actuator 10, that is, power assist control, on the basis of a steering torque $\tau$ detected by the torque sensor 14 and a vehicle speed V detected by the vehicle sensor 15.

Figure 2:
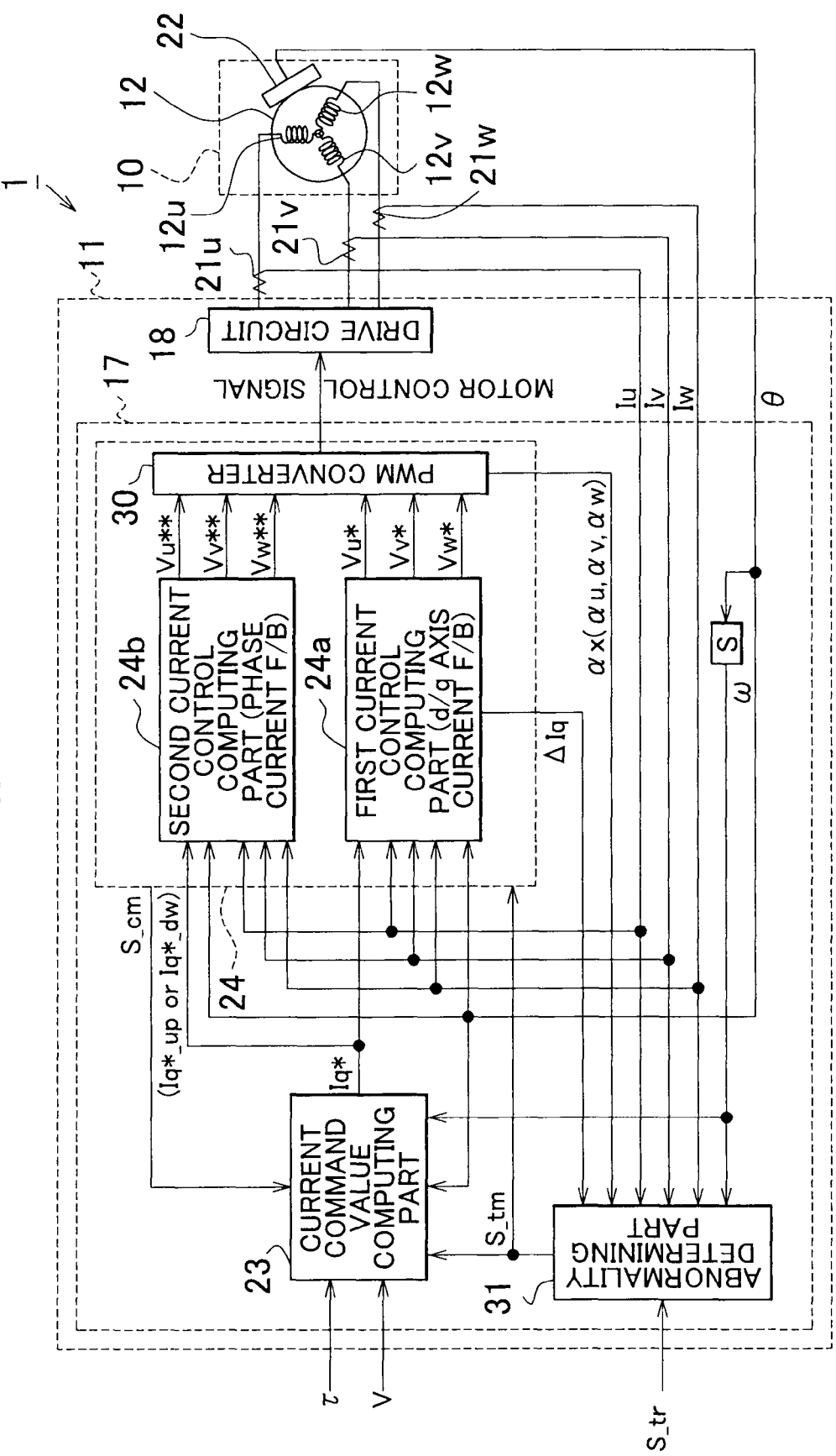
FIG. 2 is a block diagram showing an electrical configuration of the EPS.

Next, an electrical configuration of the EPS of this embodiment is described. FIG. 2 is a control block diagram of the EPS of this embodiment. As shown in the diagram, the ECU 11 has a microcomputer 17 functioning as motor control signal output means for outputting a motor control signal, and a drive circuit 18 for supplying a three-phase drive power to the motor 12 on the basis of the motor control signal.

The drive circuit 18 of this embodiment is a conventional PWM inverter that is structured such that a pair of switching elements connected in series is set as a basic unit (arm) and three arms corresponding to the respective phases are connected in parallel. A motor control signal that is output from the microcomputer 17 defines an ON duty ratio of each of the switching elements constructing the drive circuit 18. The motor control signal is applied to a gate terminal of each of the switching elements, and each of the switching elements is turned on and off in response to the motor control signal. Accordingly, a direct-current (DC) voltage of a vehicle power source (not shown) is converted into a three-phase (U, V and W) drive power supplied to the motor 12.

In this embodiment, the ECU 11 is connected to current sensors 21$u$, 21$v$ and 21$w$ for detecting phase current values Iu, Iv and Iw applied to the motor 12, and is connected also to a rotational angle sensor 22 for detecting a rotational angle (electrical angle) $\theta$ of the motor 12. The microcomputer 17 outputs the motor control signal to the drive circuit 18 on the basis of not only each of the phase current values Iu, Iv and Iw of the motor 12 that are detected on the basis of the output signal of each of the sensors, but also the rotational angle $\theta$, the steering torque $\tau$, and the vehicle speed V.

In other words, the microcomputer 17 of this embodiment determines an assist power (target assist power) to be applied to the steering system, on the basis of the steering torque $\tau$ and the vehicle speed V, and then executes current control based on each of the detected phase current values Iu, Iv and Iw and the rotational angle $\theta$ in order to generate the target assist power in the motor 12. In this manner, the microcomputer 17 generates the abovementioned motor control signal.

Specifically, the microcomputer 17 is provided with a current command value computing part 23 that functions as current command value computing means for computing a current command value as a control target value of the assist power applied to the steering system, that is, the motor torque. The microcomputer 17 is also provided with a motor control signal generating part 24 that functions as motor control signal generating means for generating a motor control signal on the basis of the current command value computed by the current command value computing part 23.

The current command value computing part 23 computes a q-axis current command value Iq* of a d/q coordinate system as the current command value corresponding to the control target value of the motor torque, on the basis of the steering torque τ and the vehicle speed V that are detected by the torque sensor 14 and the vehicle speed sensor 15, respectively. The current command value computing part 23 then outputs the q-axis current command value Iq* to the motor control signal generating part 24. The q-axis current command value Iq* that is output by the current command value computing part 23 is input to the motor control signal generating part 24. The phase current values Iu, Iv and Iw detected by the current sensor 21$u$, 21$v$ and 21$w$ respectively and the rotational angle θ detected by the rotational angle sensor 22 are also input to the motor control signal generating part 24. The motor control signal generating part 24 then generates a motor control signal by executing current feedback control in the d/q coordinate system on the basis of these phase current values Iu, Iv and Iw and the rotational angle θ (electrical angle).

The motor control signal generating part 24 of this embodiment has a first current controller 24$a$ that computes three phase voltage command values Vu*, Vv* and Vw* by executing the current feedback control (d/q axis current F/B) in the d/q coordinate system. At normal times, the motor control signal is generated based on the phase voltage command values Vu*, Vv* and Vw* computed by the first current controller 24$a$.

Figure 3:
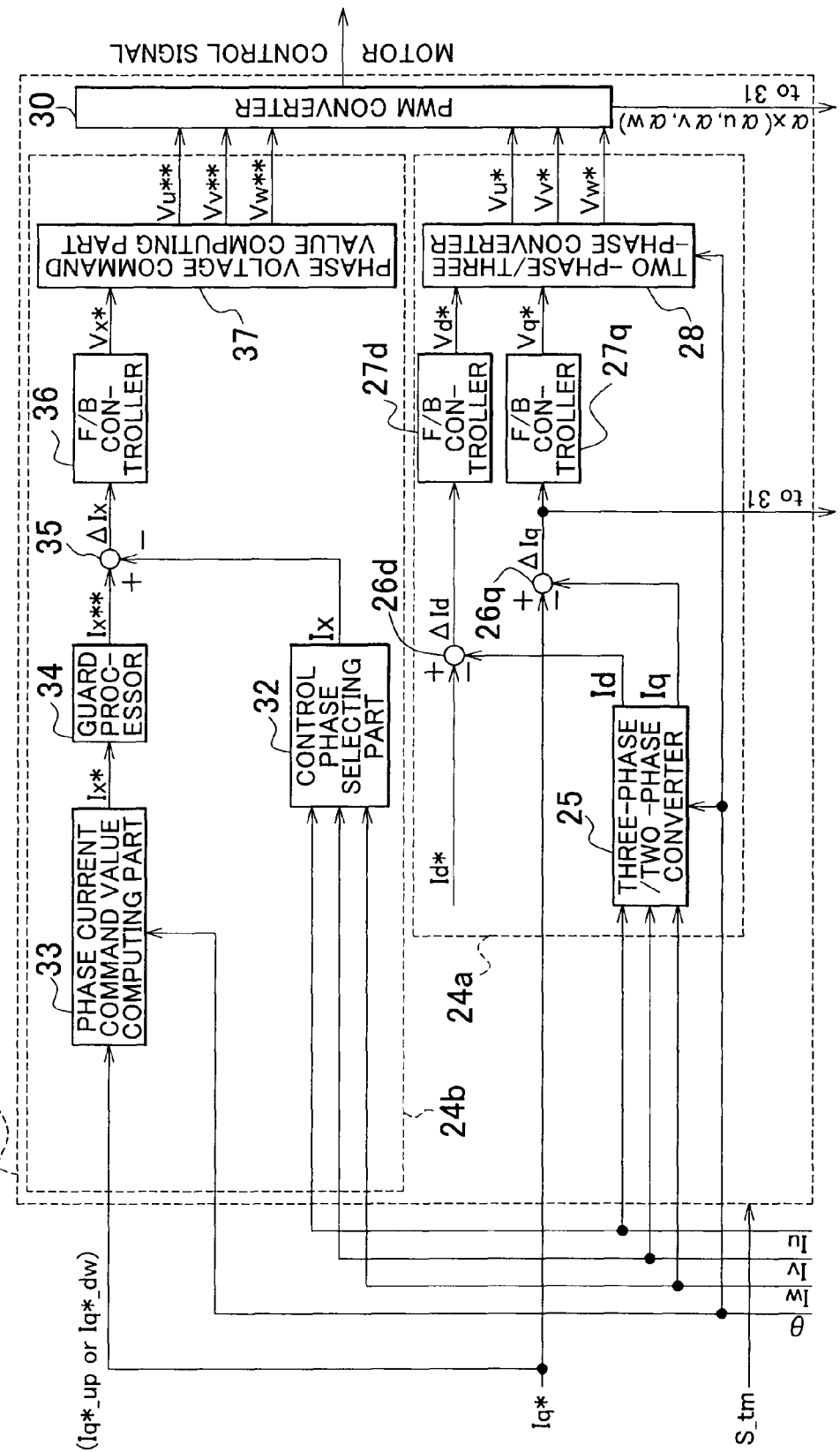
FIG. 3 is a control block diagram of a microcomputer (a motor control signal generating part) of a first embodiment.

As shown in FIG. 3, the phase current values Iu, Iv and Iw that are input to the first current controller 24$a$ are input to a three-phases/two-phases converter 25 along with the rotational angle θ, and then converted to a d-axis current value Id and a q-axis current value Iq of the d/q coordinate system by the three-phases/two-phases converter 25. The q-axis current values Iq are input to a subtracter 26$q$ along with the q-axis current command value Iq* that is input from the current command value computing part 23, while the d-axis current value Id is input to a subtracter 26$d$ along with the d-axis current command value Id* (Id*=0).

A d-axis current variation ΔId and a q-axis current variation ΔIq that are computed by the subtracters 26$d$, 26$q$ respectively are input to corresponding F/B controllers 27$d$, 27$q$. The F/B controllers 27$d$, 27$q$ then perform feedback control for making the d-axis current value Id and q-axis current value Iq, which are actual current values, follow the d-axis current command value Id* and q-axis current command value Iq* output by the current command value computing part 23.

Specifically, the F/B controllers 27$d$, 27$q$ compute a d-axis voltage command value Vd* and q-axis voltage command value Vq* by multiplying the input d-axis current variation ΔId and q-axis current variation ΔIq by a predetermined F/B gain (PI gain). These computed d-axis voltage command value Vd* and q-axis voltage command value Vq* are input to a two-phase/three-phase converter 28 along with the rotational angle θ and converted into the three phase voltage command values Vu*, Vv* and Vw*, respectively, by the two-phase/three-phase converter 28. The first current controller 24$a$ then outputs these phase voltage command values Vu*, Vv* and Vw* to a PWM converter 30.

The PWM converter 30 generates duty command values αu, αv and αw on the basis of these input phase voltage command values Vu*, Vv* and Vw* and further generates a motor control signal having an ON duty ratio indicated by each of the duty command values αu, αv and αw. Thereafter, as shown in FIG. 2, the microcomputer 17 outputs the motor control signal generated by the motor control signal generating part 24 to each of the switching elements (gate terminals) constructing the drive circuit 18, thereby activating the drive circuit 18, that is controlling supply of the drive power to the motor 12.

As shown in FIG. 2, in the ECU 11 of this embodiment the microcomputer 17 is provided with an abnormality determining part 31 for identifying the aspect of an abnormality upon occurrence of any abnormality in the EPS 1. The ECU 11 (microcomputer 17) accordingly changes a control mode of the motor 12 in response to the aspect of the abnormality identified (determined) by the abnormality determining part 31.

In other words, an abnormality signal S_tr for detecting an abnormality in a mechanical system of the EPS actuator 10 is input to the abnormality determining part 31, and the abnormality determining part 31 detects an abnormality in the mechanical system of the EPS 1 on the basis of the input abnormality signal S_tr. Moreover, the detected phase current values Iu, Iv and Iw, rotational angular velocity ω, the q-axis current variation ΔIq computed by the motor control signal generating part 24 (first current controller 24$a$), and the duty command values αu, αv and αw of the respective phases are input to the abnormality determining part 31. The abnormality determining part 31 then determines the occurrence of an abnormality in a control system on the basis of these input signals.

Specifically, the abnormality determining part 31 of this embodiment monitors the q-axis current variation ΔIq in order to determine the occurrence of an abnormality associated with the entire control system, such as a failure of the torque sensor 14 or the drive circuit 18. Specifically, the abnormality determining part 31 compares the q-axis current variation ΔIq with a predetermined threshold value and, when the q-axis current variation ΔIq becomes equal to or grater than the threshold value (for at least a predetermined amount of time), determines that an abnormality occurs in the control system.

The abnormality determining part 31 further determines the occurrence of a phase having an electrification failure caused by disconnection of power lines (including a motor coil) or a contact failure of the drive circuit 18, on the basis of the phase current values Iu, Iv and Iw, the rotational angular velocity ω, and the duty command values αu, αv and αw of the respective phases. When a phase current value Ix of an X phase (X=U, V, W) is a predetermined value $I_{th}$ or lower ($|Ix| \leq I_{th}$) and the rotational angular velocity ω is within a range for determining the disconnection ($|\omega| \leq \omega 0$), the phase having an electrification failure is determined by determining whether or not a duty command value αx corresponding to this X phase is within a predetermined range (αLo≦αx≦αHi) corresponding to the predetermined value $I_{th}$ and the threshold value ω0 defining the determination range.

The predetermined range $I_{th}$ is set at a value in the vicinity of "0", and the threshold value ω0 is set at a value equivalent to the maximum number of revolutions of the motor. The threshold values (αLo, αHi) are set at a value smaller than a lower limit taken by the duty command value αx and a value larger than an upper limit in normal control.

Figure 4:
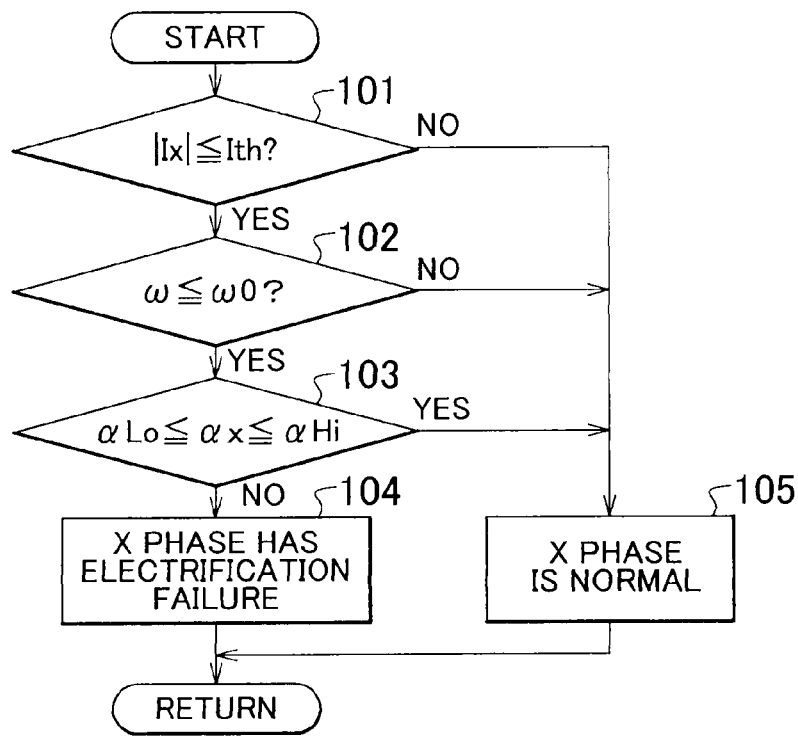
FIG. 4 is a flowchart showing a procedure for detecting a phase having an electrification failure.

Specifically, as shown in the flowchart of FIG. 4, the abnormality determining part 31 determines whether the absolute value of the detected phase current value Ix is the predetermined value $I_{th}$, or lower (step 101). When it is the predetermined value $I_{th}$ or lower (|Ix|≦$I_{th}$, step 101: YES), the abnormality determining part 31 determines whether (the absolute value of) the rotational angular velocity ω is the predetermined threshold value ω0 or lower (step 102). When the rotational angular velocity ω is the predetermined threshold value ω0 or lower (|ω|≦ω0, step 102: YES), the abnormality determining part 31 determines whether the duty command value αx is within the abovementioned predetermined range (αLo≦αx≦αHi) (step 103). When the duty command value αx is not within this predetermined range (step 103: NO), the abnormality determining part 31 determines that an electrification failure occurs in the X phase (step 104).

When the phase current value Ix is larger than the predetermined value $I_{th}$ (|Ix|>$I_{th}$, step 101: NO), or when the rotational angular velocity ω is larger than the threshold value ω0 (|ω|>ω0, step 102: NO), or when the duty command value αx is within the abovementioned predetermined range (αLo≦αx≦αHi, step 103: YES), the abnormality determining part 31 determines that no electrification failure occurs in the X phase (that the X phase is normal, step 105).

Specifically, when an electrification failure (disconnection) occurs in the X phase (any of the U, V and W phases), the phase current value Ix of this phase becomes "0". Here, when the phase current value Ix of the X phase becomes "0" or "a value in the vicinity of 0", the following two cases could happen in addition to such disconnection.

In consideration of the cases where the rotational angular velocity of the motor reaches the maximum number of revolutions of the motor, and the current command itself is approximately "0", in this embodiment, first, the phase current value Ix of the X phase to be subjected to the determination is compared with the predetermined value $I_{th}$ in order to determine whether the phase current value Ix is "0" or not. Then, it is determined whether the result of the determination is applied to the above two cases. When the result is not applied to the two cases, it is determined that disconnection occurs in the X phase.

More specifically, when the output duty command value αx is excessive in spite of the rotational angular velocity ω that is not high enough that the phase current value Ix does not become equal to or lower than the predetermined value $I_{th}$ in the vicinity of "0", it can be determined that an electrification failure occurs in the X phase. Moreover, this embodiment is so structured to identify the phase having an electrification failure, by executing the above-described determination sequentially on the U, V and W phases.

Although not shown in the flowchart of FIG. 4 for convenience of explanation, the determination described above is performed based on the assumption that the source voltage is at least a defined voltage required to drive the motor 12. In addition, final determination for detecting an abnormality is performed depending on whether the situation determined by the predetermined step 104 as that an electrification failure occurs lasts for a predetermined amount of time or longer.

In this embodiment, the ECU 11 (microcomputer 17) switches the control mode of the motor 12 on the basis of the result of the abnormality determination performed by the abnormality determining part 31. Specifically, the abnormality determining part 31 outputs the result of the abnormality determination including the abovementioned electrification failure detection in the form of an abnormality detection signal S_tm. The current command value computing part 23 then computes a current command value corresponding to this abnormality detection signal S_tm to be input, and the motor control signal generating part 24 generates a motor control signal corresponding to the same. As a result, the microcomputer 17 can switch the control mode of the motor 12.

More specifically, the ECU 11 of this embodiment has three control modes: "normal control mode", which is a control mode for a normal state; "assist suspension mode", which is a control mode used when an abnormality is caused to induce suspension of the driven motor 12; and "two phase drive mode", which is a control mode used when an electrification failure occurs in any of the phases of the motor 12. When the abnormality detection signal S_tm output by the abnormality determining part 31 corresponds to the "normal control mode", the current command value computing part 23 computes a current command value for the normal state, and the motor control signal generating part 24 generates a relevant motor control signal.

On the other hand, when the abnormality detection signal S_tm output by the abnormality determining part 31 corresponds to the "assist suspension mode", the current command value computing part 23 computes a current command value and the motor controls signal generating part 24 generates a motor control signal, in order to suspend the drive of the motor 12. Examples of the situations where the "assist suspension mode" is selected include a situation where an abnormality occurs in the mechanical system or the torque sensor 14, and a situation where an excess current is generated when an abnormality occurs in a power supply system. The situations where "assist suspension mode" is selected further include a situation where the drive of the motor 12 needs to be suspended immediately, and a situation where the drive of the motor 12 needs to be stopped after gradually reducing the outputs of the motor 12, that is, gradually reducing the assist power. In the latter case, the motor control signal generating part 24 gradually reduces the value (absolute value) of the q-axis current command value Iq* that is output as the current command value. After stopping the motor 12, the microcomputer 17 brings each of the switching elements constructing the drive circuit 18 into an open state, and opens a power source relay, which is not shown.

The abnormality detection signal S_tm corresponding to the "two phase drive mode" has information required to identify the phase having an electrification failure. When the abnormality detection signal S_tm output by the abnormality determining part 31 corresponds to the "two phase drive mode", the motor control signal generating part 24 generates a motor control signal that instructs to continuously drive the motor with the two phases other than the phase with an electrification failure.

In other words, as shown in FIG. 2, in addition to the first current controller 24a that computes the phase voltage command values Vu*, Vv* and Vw* by executing the current feedback control in the d/q coordinate system, the motor control signal generating part 24 of this embodiment has a second current controller 24b that computes phase voltage command values Vu, Vv and Vw by executing phase current feedback control. When the abnormality detection signal S_tm input from the abnormality determining part 31 corresponds to the "two phase drive mode", the ECU 11 outputs a motor control signal on the basis of the phase voltage command values Vu, Vv and Vw computed by the second current controller 24b.

More specifically, as shown in FIG. 3, the second current controller 24b of this embodiment is provided with a control phase selecting part 32 for selecting one of the remaining two phases other than the detected phase with an electrification failure, as a control phase, and a phase current command value computing part 33 for computing a phase current command value Ix* (X=any of U, V and W) of the phase selected as the control phase. By executing the phase current feedback control on the basis of the variation between the phase current value Ix and the phase current command value Ix* (Ix) of the control phase, the phase voltage command values Vu, Vv and Vw to drive the motor with the two electrification phases other than the phase with an electrification failure.

Concretely, the phase current command value Ix* output by the phase current command value computing part 33 is input to a guard processor 34. The phase current command value Ix* is subjected to guard processing, and a resultant phase current command value Ix is input to a subtracter 35 along with the phase current value Ix of the phase that is selected as the control phase by the control phase selecting part 32. The subtracter 35 then computes a phase current variation ΔIx by subtracting the phase current value Ix from the phase current command value Ix and outputs the computed phase current variation ΔIx to a F/B controller 36. The F/B controller 36 multiplies the input phase current variation ΔIx by the predetermined F/B gain (PI gain) and thereby computes a phase voltage command value Vx* of the control phase.

The phase voltage command value Vx* computed by the F/B controller 36 is input to a phase voltage command value computing part 37. The phase voltage command value computing part 37 then computes the phase voltage command values Vu, Vv and Vw** based on the phase voltage command value Vx* of the control phase.

Specifically, the phase with an electrification failure cannot be electrified and each of the electrification phases is shifted by π/2 (180°) during the two phase drive. Therefore, while the phase voltage command value of the phase having an electrification failure is "0", the phase voltage command values of the rest of the electrification phases can be computed by inverting the sign of the phase voltage command value Vx* associated with the control phase. The second current controller 24b of this embodiment then outputs the phase voltage command values Vu, Vv and Vw** computed as above to the PWM converter 30.

Here, during the two phase drive, the phase current command value computing part 33 of this embodiment computes the phase current command value Ix* at which a motor current (q-axis current value Iq) corresponding to the control target value of a requested torque, i.e., the motor torque (q-axis current command value Iq*), except for a predetermined rotational angle corresponding to the phase with an electrification failure.

Specifically, in accordance with the phase with an electrification failure, the phase current command value computing part 33 computes the phase current command value Ix* of one of the remaining two phases on the basis of the following equations (1) to (3).

When the U phase has an electrification failure:

$$I_v^* = \frac{I_q^*}{\sqrt{2}\cos\theta} \quad (1)$$

When the V phase has an electrification failure:

$$I_u^* = \frac{-I_q^*}{\sqrt{2}\sin(\theta - \frac{\pi}{6})} \quad (2)$$

When the W phase has an electrification failure:

$$I_v^* = \frac{I_q^*}{\sqrt{2}\sin(\theta + \frac{\pi}{6})} \quad (3)$$

Figure 5:
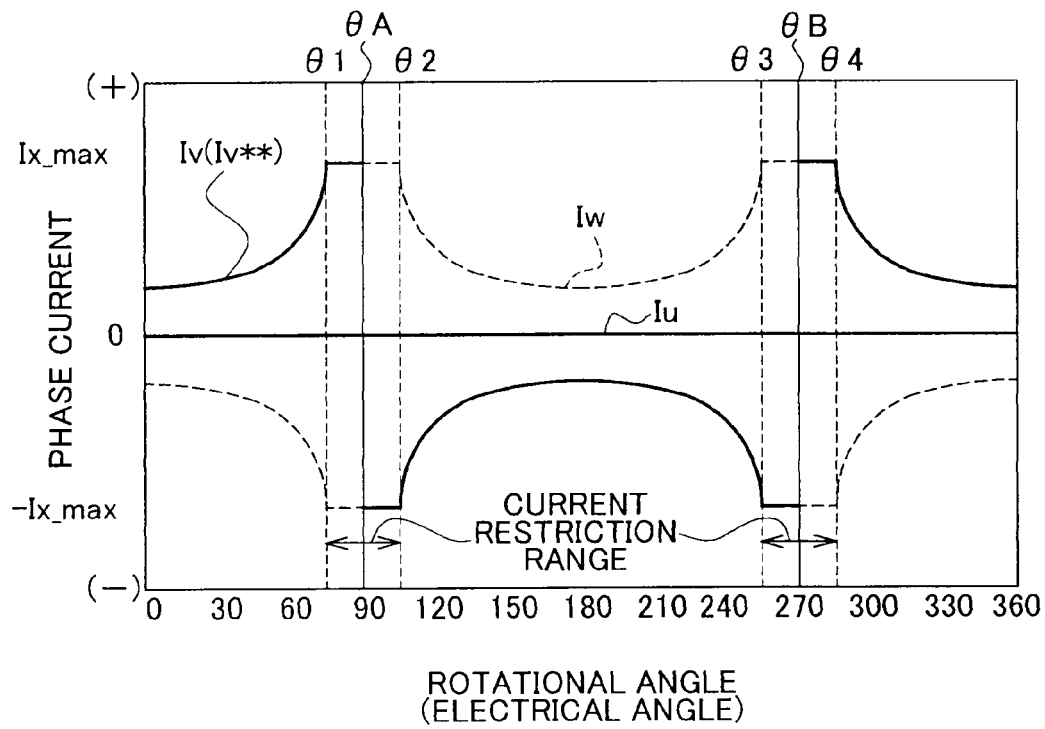
FIG. 5 is an explanatory diagram showing how each phase current changes during two phase drive (when a U phase has an electrification failure)

Specifically, each of the above equations (1) to (3) obtain the phase current command value Ix* that changes in the form of a secant curve (inverse of cos θ (secant: secθ)) or a cosecant curve (inverse of sin θ (cosecant: cosecθ)) based on asymptotic lines, which are predetermined rotational angles θA, θB corresponding to the phase having an electrification failure (see FIG. 5). Thereafter, the phase current feedback control is executed based on the phase current command value Ix* that changes in the form of a secant curve or a cosecant curve. As a result, theoretically, the motor current (q-axis current value Iq) corresponding to the requested torque (q-axis current command value Iq*) can be generated, except for the predetermined rotational angles θA, θB corresponding to these asymptotic lines.

Figure 6:
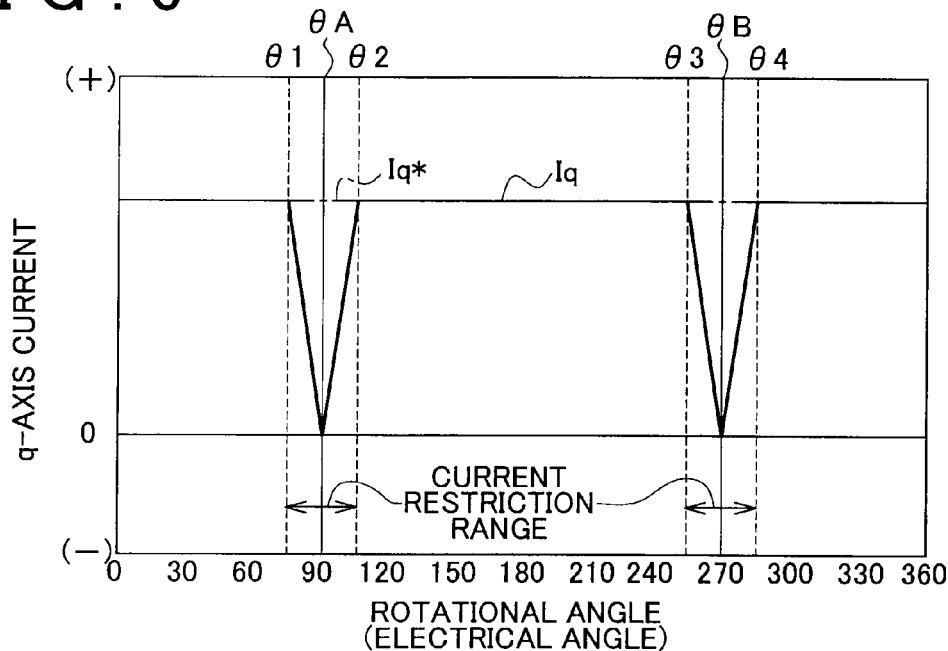
FIG. 6 is an explanatory diagram showing how a q-axis current changes during two phase drive (when the U phase has an electrification failure)

FIGS. 5 and 6 show examples where the U phase is the phase with an electrification failure and the V and W phases are the two electrification phases, wherein the smaller rotational angle out of the two rotational angles corresponding to each of the abovementioned asymptotic lines is taken as the rotational angle θA, and the larger rotational angle as the rotational angle θB, in an electrical angle range of 0° to 360°. In this case, the rotational angles θA, θB are "90°" and "270°" respectively. When the V phase is the phase with an electrification failure, the predetermined rotational angles θA, θB become "30°" and "210°" respectively. When the W phase is the phase with an electrification failure, the predetermined rotational angles θA, θB become "150°" and "330°" respectively (not shown).

In actuality, the amount of current (absolute values) that can be applied to motor coils 12u, 12v and 12w of the respective phases is limited. In this embodiment, therefore, the guard processor 34 executes the guard processing to restrict the phase current command value Ix* provided by the phase current command value computing part 33 within a predetermined range (−Ix_max≦Ix*≦Ix_max). Note that "Ix_max" is the value of the maximum current applied to the X phase (U, V, W phases), and this maximum value is defined by a rated current of each of the switching elements constructing the drive circuit 18. Therefore, within a range where the guard processing is performed (current restriction range: θ1<θA<θ2, θ3<θB<θ4), the phase current command value Ix** obtained as a result of the guard processing becomes constant at its upper limit (Ix_max) or lower limit (−Ix_max) that can be applied to the motor coils.

Specifically, the microcomputer 17 of this embodiment executes the phase current feedback control in order to supply each electrification phase with a phase current that changes in the form of a secant curve or a cosecant curve, and thereby generates the motor current corresponding to the requested torque, except for the current restriction range (θ1<θA<θ2, θ3<θB<θ4) set around the predetermined rotational angles θA, θB corresponding to the asymptotic lines. Accordingly, even when an electrification failure occurs, the assist power can be applied continuously while maintaining good steering feeling, without generating a significant torque ripple.

Figure 7:
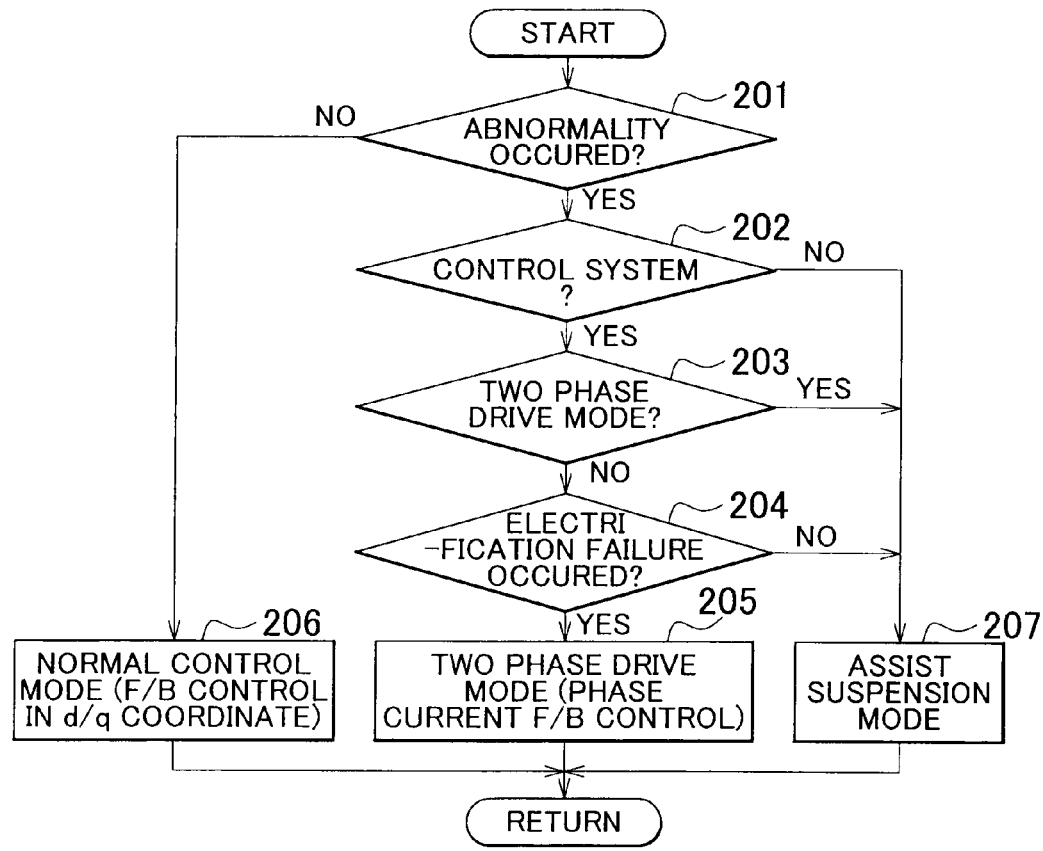
FIG. 7 is a flowchart showing a procedure for determining an abnormality and switching a control mode.

Next are described the procedures for the abnormal determination, switching of the control modes, and generation of motor control signal during the two phase drive, which are performed by the microcomputer. As shown in the flowchart of FIG. 7, the microcomputer 17 first determines whether any abnormality occurs (step 201). When determining that an abnormality occurs (step 201: YES), the microcomputer 17 then determines when the abnormality occurs in the control system (step 202). Next, when it is determined in step 202 that the abnormality occurs in the control system (step 202: YES), the microcomputer 17 determines whether the present control mode is the two phase drive mode (step 203). When the present control mode is not the two phase drive mode (step 203: NO), the microcomputer 17 determines whether the abnormality of the control system means the occurrence of the phase having an electrification failure (step 204). When it is determined that the phase with an electrification failure occurs (step 204: YES), the microcomputer 17 executes output of a motor control signal with the remaining two phases other than the phase with an electrification failure (two drive phase mode, step 205).

As described above, the output of the motor control signal in the two phase drive mode is executed by computing the phase current command value that changes in the form of a secant curve or a cosecant curve based on the asymptotic lines, which are the predetermined rotational angles θA, θB corresponding to the phase having an electrification failure, and executing the phase current feedback control based on this phase current command value.

Figure 8:
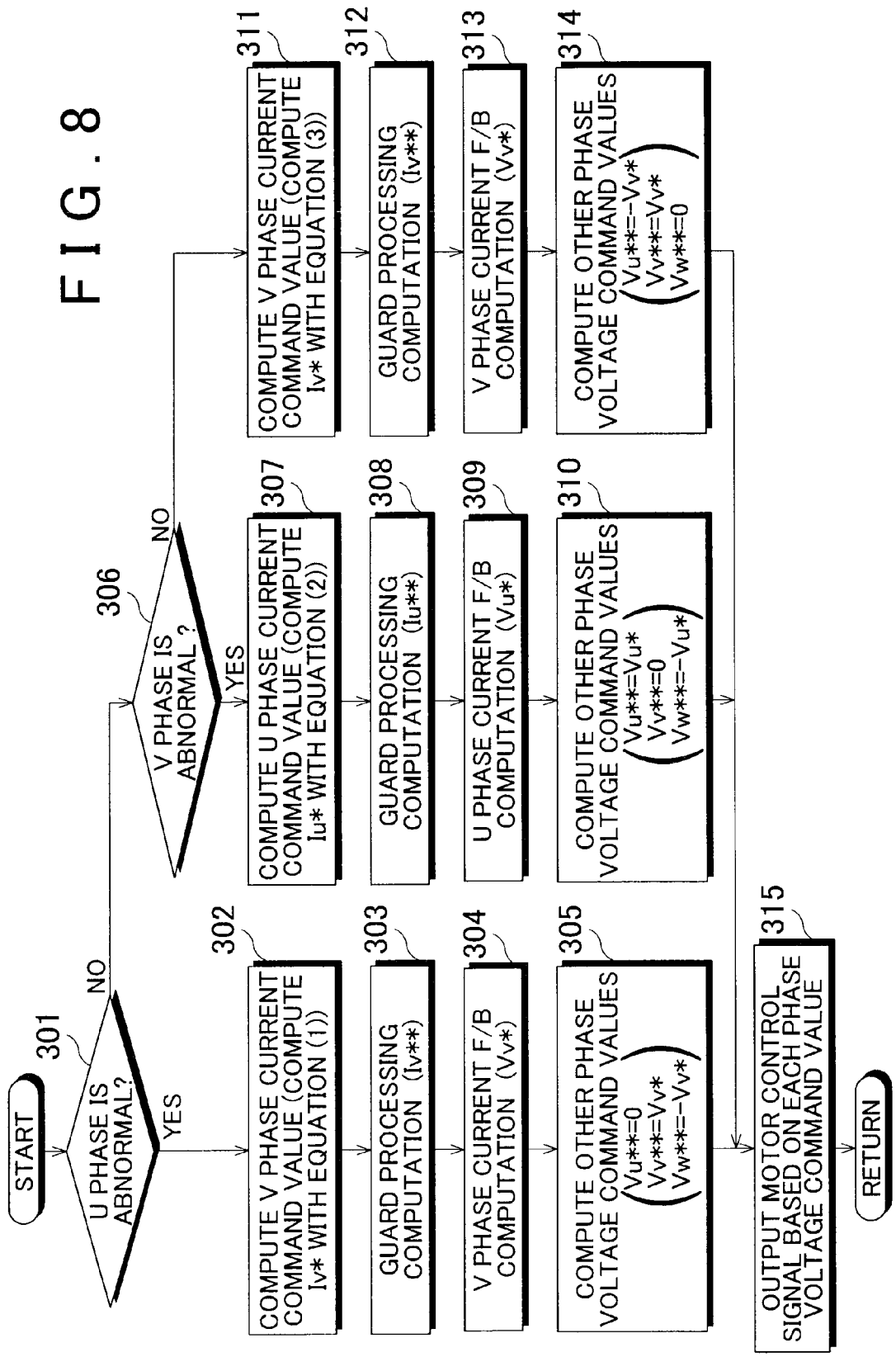
FIG. 8 is a flowchart showing a procedure for generating a motor control signal during two phase drive.

Specifically, as shown in the flowchart of FIG. 8, the microcomputer 17 determines whether the phase with an electrification failure is the U phase (step 301). When the phase with an electrification failure is the U phase (step 301: YES), the microcomputer 17 computes the phase current command value Iv* for the V phase on the basis of the above equation (1) (step 302). The microcomputer 17 then executes guard processing computation on the phase current command value Iv* and restricts the resultant phase current command value Iv** within a predetermined range (step 303). The microcomputer 17 thereafter computes the phase voltage command value Vv* for the V phase by executing the phase current feedback control on the basis of this phase current command value Iv (step 304), and computes the phase voltage command values Vu, Vv and Vw for the respective phases on the basis of the phase voltage command value Vv* (Vu=0, Vv=Vv*, Vw**=−Vv*, step 305).

On the other hand, when it is determined in step 301 that the phase with an electrification failure is not the U phase (step 301: NO), the microcomputer 17 determines whether the phase with an electrification failure is the V phase (step 306). When the phase with an electrification failure is the V phase (step 306: YES), the microcomputer 17 computes the phase current command value Iu* for the U phase on the basis of the above equation (2) (step 307). Next, the microcomputer 17 executes the guard processing computation on the phase current command value Iu* and restricts the resultant phase current command value Iu within a predetermined range (step 308). The microcomputer 17 then executes the phase current feedback control on the basis of this phase current command value Iv (step 309), and then computes the phase voltage command values Vu, Vv and Vw** for the respective phases on the basis of the phase voltage command value Vu* computed by the execution of the phase current feedback control (Vu**=Vu*, Vv=0, Vw=−Vu*, step 310).

When it is determined in step 306 that the phase with an electrification failure is not the V phase (step 306: NO), the microcomputer 17 computes the phase current command value Iv* for the V phase on the basis of the above equation (3) (step 311), executes the guard processing computation, and then restricts the resultant phase current command value Iv within a predetermined range (step 312). The microcomputer 17 then executes the phase current feedback control on the basis of this phase current command value Iv (step 313), and computes the phase voltage command values Vu and Vw for the remaining two phases (V and W phases) on the basis of the phase voltage command value Vv* computed by the execution of the phase current feedback control (Vu**=−Vv*, Vv**=Vv*, Vw**=0, step 314).

The microcomputer 17 generates the motor control signals based on the phase voltage command values Vu, Vv and Vw** computed in steps 305, 310 and 314, and outputs these values to the drive circuit 18 (step 315).

Note that when it is determined in step 201 that there is no abnormality (step 201: NO), the microcomputer 17 executes the output of the motor control signals by executing the current feedback control in the d/q coordinate system, as described above (normal control mode, step 206). When it is determined in step 202 that an abnormality occurs in a system other than the control system (step 202: NO), or when it is determined in step 203 that the control mode is already the two phase drive mode (step 203: YES), or when it is determined in step 203 that an abnormality other than the occurrence of the phase with an electrification failure occurs (step 203: NO), the microcomputer 17 shifts the control mode to the assist suspension mode (step 207). Then, the microcomputer 17 outputs the motor control signal for suspending the drive of the motor 12 and opens the power source relay.

Next is described an aspect of control performed for preventing the steering wheel from being stuck during low-speed steering, according to this embodiment. As described above, during the two phase drive, the current control is performed for restricting the phase current command value Ix* within the predetermined range (−Ix_max≦Ix*≦Ix_max), in order to prevent the phase current command value Ix* changing in the form of a secant curve or a cosecant curve from generating the occurrence of the phase current value Ix that exceeds the acceptable range of the power supply line or each switching element. Therefore, in the current restriction range (θ1<θA<θ2, θ3<θB<θ4) that is set around the predetermined rotational angles θA, θB corresponding to the asymptotic lines, the value of the phase current command value Ix* (phase current value Ix) becomes constant at its upper limit (Ix_max) or lower limit (−Ix_max) that can be applied to the motor coils (see FIG. 5).

However, when the motor control is essentially performed by applying the abovementioned phase current that changes in the form of a secant curve or a cosecant curve, theoretically, the absolute value of the phase current value Ix needs to be increased to infinity in the vicinity of the predetermined rotational angles θA, θB in order to generate a constant motor torque. Therefore, when the above-described current restriction is executed, the generated motor torque falls below an assist power target value in the current restriction range; which might interfere with smooth motor rotation.

Figure 9:
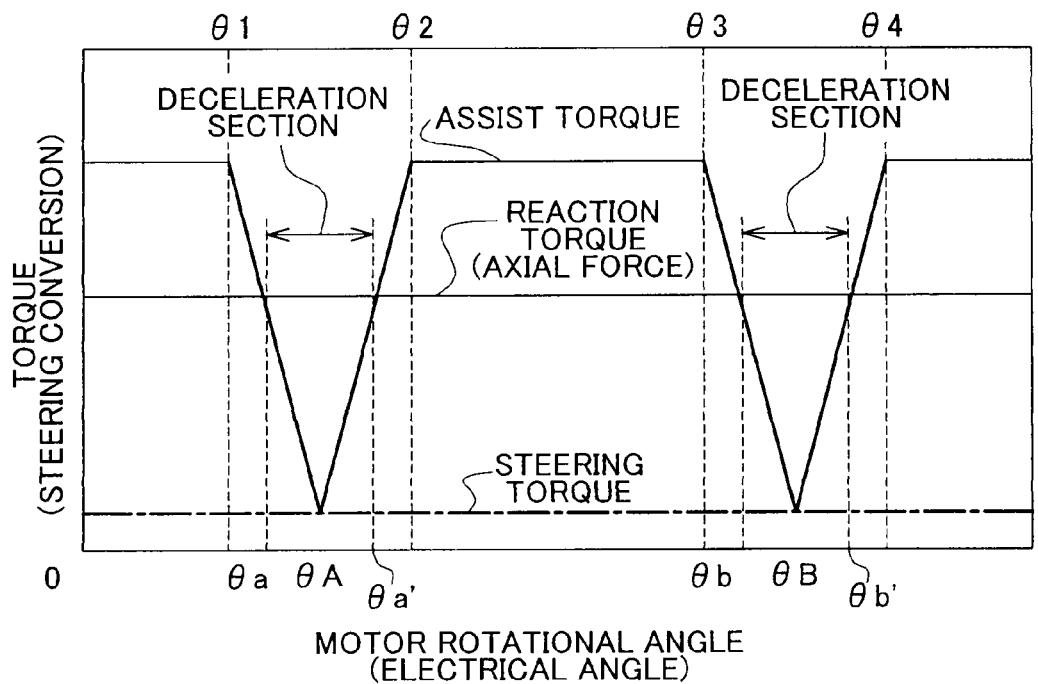
FIG. 9 is an explanatory diagram showing deceleration sections in the vicinity of predetermined rotational angles where the directions of corresponding phase currents are switched.

More specifically, during the two phase drive, due to the fact that the torque in the steering direction (the sum of the steering torque and the assist torque) falls below a reaction torque in a return direction (axial force) in the vicinity of the predetermined rotational angles θA, θB, rather than due to a decrease in the motor torque (assist torque) caused by the current restriction, a section where the steering speed decreases appears (deceleration section: θa<θA<θa', θb<θB<θb'), as shown in FIG. 9.

Specifically, when the velocity of entry into the deceleration section is taken "ωin", the velocity of escaping the deceleration section as "ωout", a motor inertia as "Jm", and the deceleration energy in this deceleration section as "−En", the following equation (4) is established based on the energy conservation law.

$$\frac{1}{2}J_m\omega_{out}^2 - \frac{1}{2}J_m\omega_{in}^2 = -E_n \quad (4)$$

The "velocity of entry" in this case indicates the value of the rotational angular velocity ω of the rotational angle θa obtained when the steering direction is "from the left to the right". Similarly, the "velocity of escape" indicates the value of the rotational angular velocity ω of a rotational angle θa'.

Therefore, in order to cause the velocity of escape ωout to exceed "0", that is, in order to cause the velocity of escape to pass through the deceleration section without stopping, the velocity of entry ωin needs to be higher than a critical velocity ωcr shown in the following equation (5).

$$\omega_{cr} = \frac{180}{\pi}\sqrt{\frac{2E_n}{J_m}} \quad (5)$$

Figure 10:
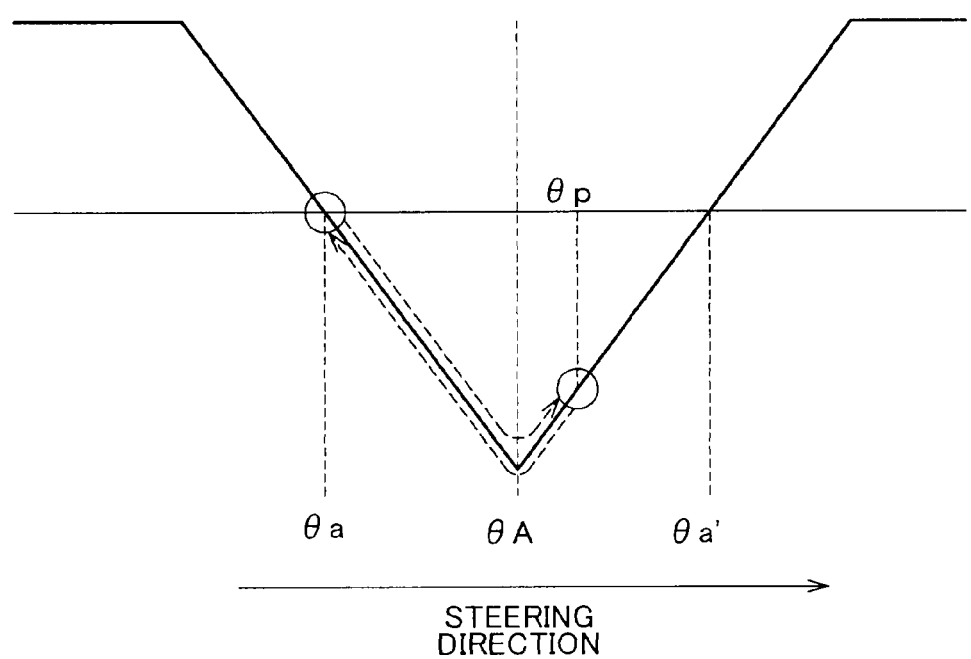
FIG. 10 is an explanatory diagram showing a mechanism of how a steering wheel gets stuck during low-speed steering.

Specifically, as shown in FIG. 10, during low-speed steering (ω≦ωcr) in which the rotational angular velocity ω is equal to or lower than the critical velocity ωcr, the deceleration section cannot be passed, and the rotational angular velocity ω becomes "0" at a rotational angle θp positioned immediately before the rotational angle θa' (on the rotational angle θa side, which is an entry angle) that is the position for escaping the deceleration section. In this deceleration section, the torque in the return direction (reaction torque) is larger than the torque in the steering direction (the sum of the steering torque and the assist torque) ("steering torque"+"assist torque"<"reaction torque (axial force)"). Therefore, the motor stops once at the rotational angle θp and thereafter rotates inversely in the return direction. Finally, the motor stops rotating at the rotational angle θa at which the torque in the steering direction and the torque in the return direction are balanced (when the steering torque is not particularly changed).

Figure 11:
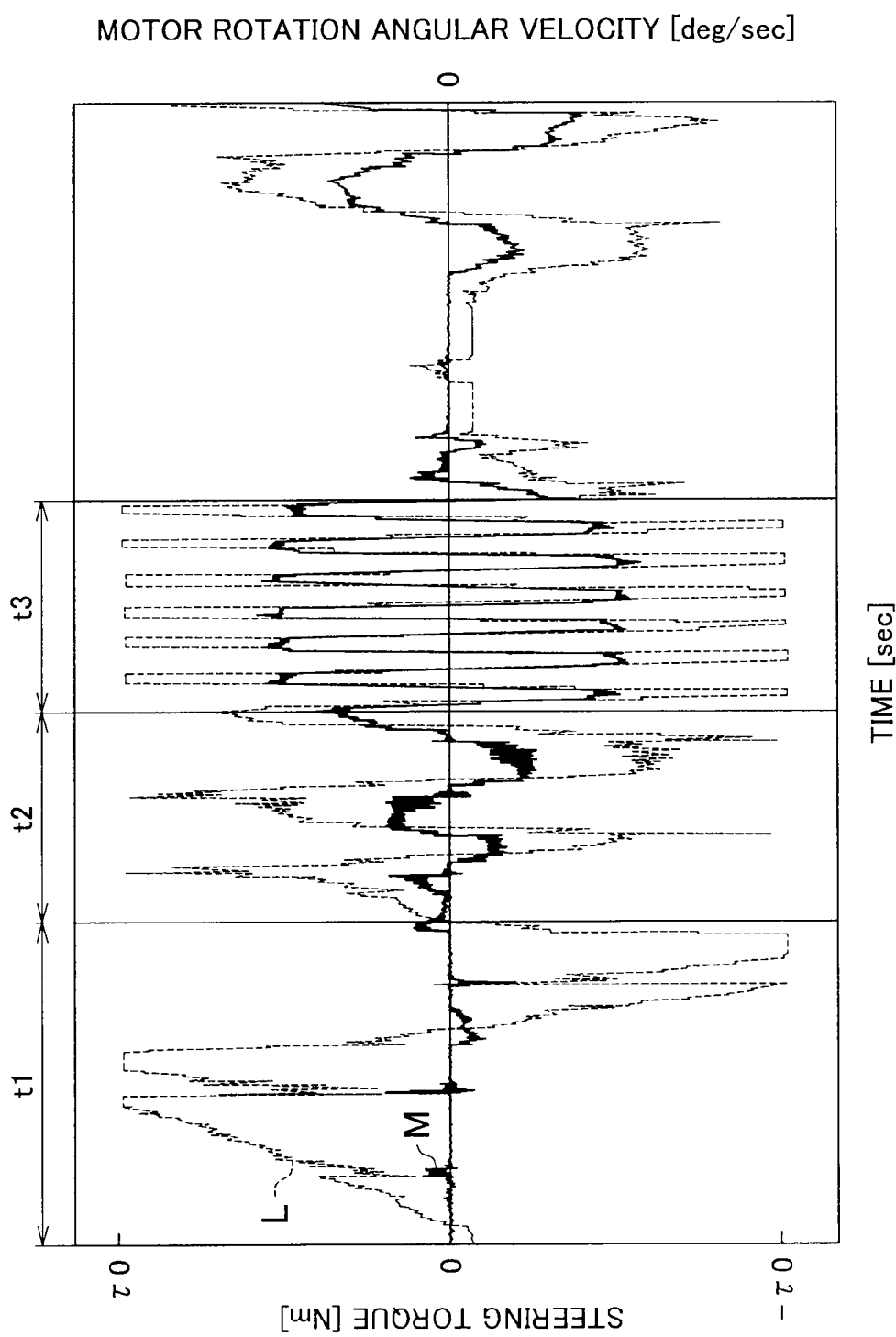
FIG. 11 is a graph showing the relationship between a steering torque and a rotational angular velocity of a motor obtained during two phase drive.

FIG. 11 is a graph showing the relationship between the steering torque τ and the rotational angular velocity ω of the motor obtained during the two phase drive, that is, the follow-up performance of the motor with respect to a steering operation. In this graph, the waveform L shown by a dashed-line indicates a transition of the steering torque τ, and the waveform M shown by a solid line indicates a transition of the rotational angular velocity ω. In this graph, a tester (driver) performs low-speed steering such that the rotational angular velocity ω becomes equal to lower than the critical velocity ωcr (ω≦ωcr), in a section t1. In other words, the tester performs a slow steering operation.

In the graph, although the value of the steering torque τ reaches its detection limit (|τ0|), only an extremely small rotational angular velocity ω is output. In other words, the motor is barely rotated and the steering wheel is stuck. It is believed that the presence of the deceleration section generated as a result of the execution of the current restriction is the cause of this stuck steering wheel.

In light of this fact, the microcomputer 17 of this embodiment executes control for accelerating the rotation of the motor 12 (acceleration control), in order to prevent the occurrence of the stuck steering wheel during the low-speed steering during the two phase drive, the stuck steering wheel being cased as a result of the execution of the current restriction.

More specifically, in this embodiment, not only the steering torque τ and the vehicle speed V, but also the rotational angle θ and rotational angular velocity ω of the motor 12 and a mode signal S_cm indicating the present control mode are input to the current command value computing part 23, as shown in FIG. 2. The current command value computing part 23 executes the acceleration control on the basis of the levels of these values.

Figure 12:
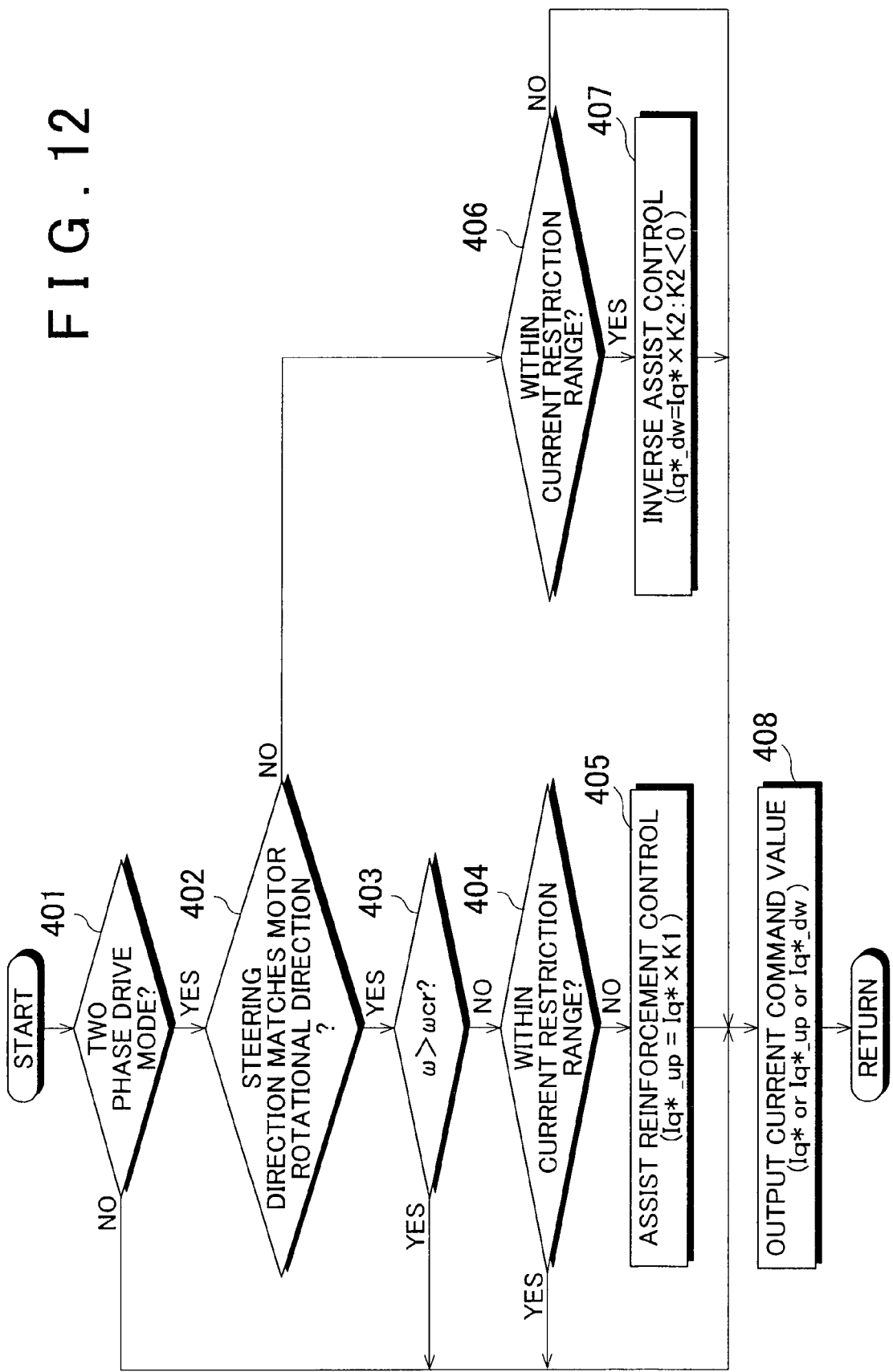
FIG. 12 is a flowchart showing a procedure of acceleration control.

As shown in the flowchart of FIG. 12, the current command value computing part 23 first determines whether the present control mode is the two phase drive mode (step 401). When the present control mode is the two phase drive mode (step 401: YES), the current command value computing part 23 determines whether the steering direction matches the rotational direction of the motor 12 (step 402).

In this embodiment, determination of the rotational direction, which is performed in step 402, is performed based on whether the sign of the steering torque τ matches the sign of the rotational angular velocity ω of the motor 12. When it is determined in step 401 that the present control mode is not the two phase drive mode (step 401: NO), the processes of step 402 and the following steps 403 to 407 are not executed.

When it is determined in step 402 that the steering direction matches the rotational direction of the motor 12 (step 402: YES), the current command value computing part 23 then determines whether the rotational angular velocity ω of the motor 12 is higher than the critical velocity ωcr (step 403). When the rotational angular velocity ω is equal to or lower than the critical velocity ωcr (ω≦ωcr, step 403: NO), the current command value computing part 23 determines whether the rotational angle θ falls within the current restriction range (θ1<θ<θ2, θ3<θ<θ4) (step 404). When the rotational angle θ is not within the current restriction range (step 404: NO), the current command value computing part 23 computes a q-axis current command value Iq*_up for reinforcing the assist torque in the steering direction (assist reinforcement control, step 405).

Figure 13:
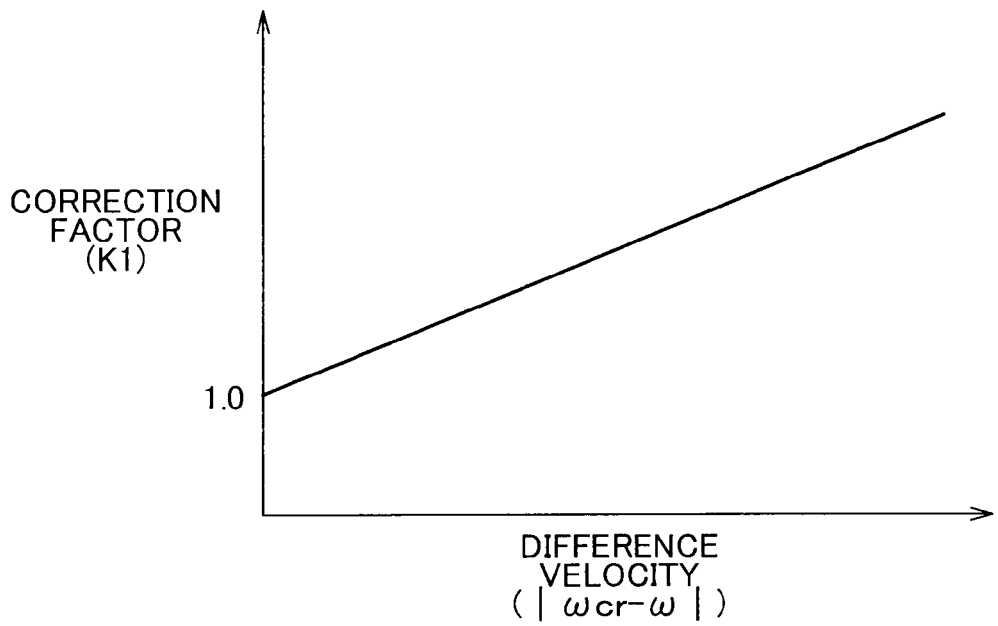
FIG. 13 is an explanatory diagram showing the relationship between a correction coefficient for assist reinforcement control and a differential velocity.

Specifically, as shown in FIG. 13, the current command value computing part 23 of this embodiment computes a correction coefficient K1 on the basis of the difference between the rotational angular velocity ω and the critical velocity ωcr (|ωcr−ω|). Note in this embodiment that the larger the difference between the rotational angular velocity ω and the critical velocity ωcr (|ωcr−ω|), the larger the correction coefficient K1, which is at least 1.0. In other words, the current command value computing part 23 computes the correction coefficient K1 that increases the absolute value of the q-axis current command value Iq*_up more significantly as the rotational angular velocity ω falls well below the critical velocity ωcr. The current command value computing part 23 then multiplies the correction coefficient K1 by the initially computed q-axis current command value Iq*, and thereby computes the q-axis current command value Iq*_up for reinforcing the assist torque in the steering direction (Iq*_up=Iq*×K1).

Specifically, when the assist torque can be reinforced in the steering direction by increasing the amount of current, the speed of the rotation of the motor 12 is increased by reinforcing the assist torque. Then, the velocity of entry ωin into the deceleration section is increased to prevent the occurrence of the stuck steering wheel.

On the other hand, when it is determined in step 402 that the steering direction does not match the rotational direction of the motor 12 (including when ω=0, step 402: NO), the current command value computing part 23 then determines whether the rotational angle θ falls within the current restriction range (θ1<θ<θ2, θ3<θ<θ4) (step 406). When the rotational angle θ is within the current restriction range (step 406: YES), the current command value computing part 23 computes a q-axis current command value Iq*_dw for generating an assist torque in a direction opposite to the steering direction (inverse assist control, step 407).

Specifically, in step 407, the current command value computing part 23 of this embodiment computes the q-axis current command value Iq*_dw for generating an assist torque in the direction opposite to the steering direction, by multiplying a predetermined correction coefficient K2 having a value of −1.0 or lower by the initially computed q-axis current command value Iq* (Iq*_dw=Iq*×K2).

Figure 14:
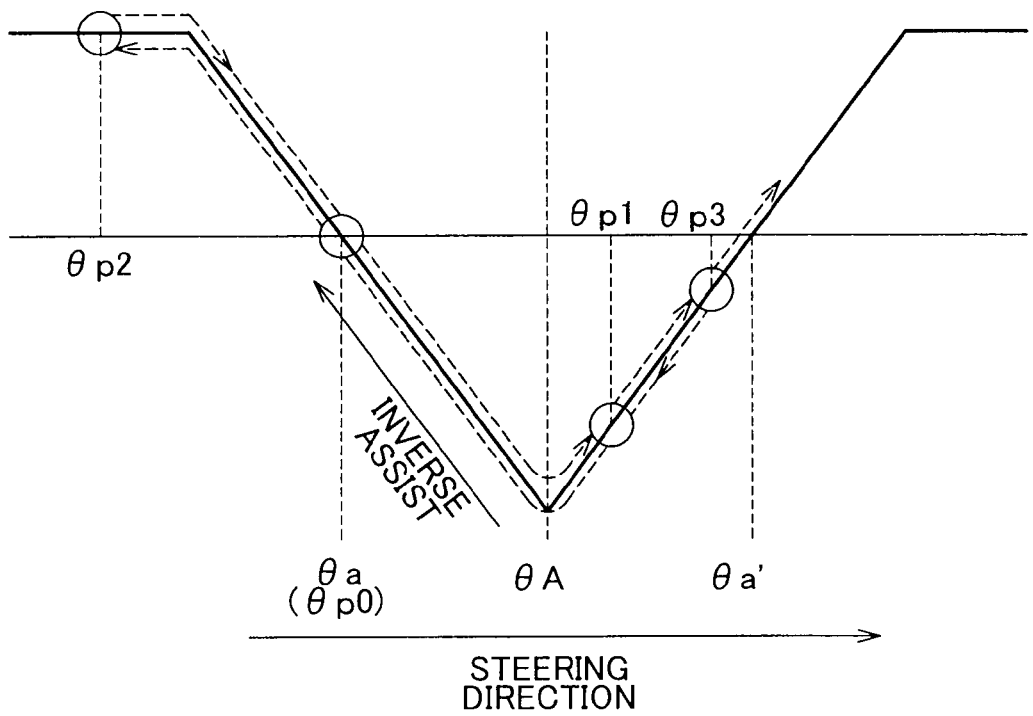
FIG. 14 is an explanatory diagram showing a mechanism of how the rotational angular velocity is increased by inverse assist control.

Specifically, as shown in FIG. 14, when the velocity of entry ωin into the deceleration section (for example, the rotational angular velocity ω of the rotational angle θa) is equal to or lower than the critical velocity ωcr, the deceleration section cannot be passed. Then, after a rotational angle θp1, the motor 12 rotates inversely in the return direction (see FIG. 10).

However, as shown in FIG. 14, by assisting the inverse rotation of the motor 12 by providing a inverse assist, that is, by accelerating the speed of the rotation of the motor 12 in the opposite direction, the position of entry (rotational angle θa (θp0) into the deceleration section is passed at a rotational angular velocity ω higher than the velocity of entry ωin, at the time of the inverse rotation. Then, after returning to a rotational angle θp2 that is positioned far from the position of entry in the return direction, the motor 12 rotates in the steering direction again. At this moment, the steering system is twisted due to the inverse rotation of the motor 12, whereby the absolute value of the steering torque τ detected by the torque sensor 14 increases. The motor 12 is then accelerated in the steering direction again by the large assist power computed based on this steering torque τ. As a result, the velocity of entry ωin that is higher than that obtained upon the previous entry can be achieved. Specifically, it is possible to achieve the velocity of entry ωin at which a rotational angle θp3 can be reached, the rotational angle θp3 being positioned in the forward direction from the rotational angle θp1 and at the maximum point at the time of the previous entry.

When the velocity of entry ωin upon reentry is equal to or lower than the critical velocity ωcr, that is, when the rotational angle θp3, the maximum point, is within the deceleration section, the rotation is repeatedly accelerated by such inverse operation and inverse assist application. As a result, the velocity of entry ωin higher than the critical velocity ωcr can be achieved, and the occurrence of the stuck steering wheel can be prevented by passing through the deceleration section.

The reason that the "inverse assist control (step 407)" is performed when the motor 12 is stopped within the current restriction range (rotational angular velocity ω=0) is because the assist torque cannot be reinforced in the current restriction range (because there is no room to increase the amount of current at the time of current restriction), and because the reaction torque in the return direction is larger than the steering torque in the deceleration section.

In the subsequent step 408, the current command value computing part 23 outputs the q-axis current command value Iq*_up when computing the q-axis current command value Iq*_up by means of the assist reinforcement control performed in step 405, and also outputs the q-axis current command value Iq*_dw when computing the q-axis current command value Iq*_dw by means of the inverse assist control performed in step 407.

When it is determined in step 403 that the rotational angular velocity ω is higher than the critical velocity ωcr (ω>ωcr, step 403: YES), or when it is determined in step 404 that the rotational angle θ is within the current restriction range (step 404: YES), the assist reinforcement control processing of step 405 is not executed. Moreover, when it is determined in step 406 that the rotational angle θ is not within the current restriction range (step 406: NO), the inverse assist control processing of step 407 is not executed. When the assist reinforcement control of step 405 and the inverse assist control of step 407 are not executed, the q-axis current command value Iq* is output as usual, in step 408.

As described above, this embodiment can achieve the following operational effects:

During the two phase drive, the microcomputer 17 executes the control for accelerating the rotation of the motor in order to prevent the occurrence of the stuck steering wheel during low-speed steering that is caused as a result of the execution of the current restriction (acceleration control).

Specifically, when the motor control is essentially performed by applying the abovementioned phase current that changes in the form of a secant curve or a cosecant curve, theoretically, (the absolute value of) the phase current value Ix needs to be increased to infinity in the vicinity of the predetermined rotational angles θA, θB in order to generate a constant motor torque. Therefore, when the current restriction is executed in the vicinity of the predetermined rotational angles θA, θB, the generated motor torque falls below an assist power target value in the current restriction range. As a result, due to the fact that the torque in the steering direction (the sum of the steering torque and the assist torque) falls below the reaction torque in the return direction (axial force), a section where the steering speed decreases appears. This deceleration section might interfere with smooth motor rotation, that is, stable application of the assist power. Especially during low-speed steering in which the rotational angular velocity ω of the motor becomes equal to or lower than the critical velocity ωcr required to pass through the deceleration section, the motor 12 stops rotating when the torque in the steering direction and the reaction torque (axial force) in the return direction are balanced. This phenomenon might cause the so-called stuck steering wheel.

However, by executing the above-described acceleration control, the rotational angular velocity ω of the motor 12 can be increased to prevent the occurrence of the stuck steering wheel. As a result, smooth motor rotation can be achieved and the assist power can be provided stably, even during the low-speed steering.

During the two phase drive, when the steering direction matches the rotational direction of the motor 12 and the rotational angular velocity ω is equal to or lower than the critical velocity ωcr (ω≦ωcr), the current command value computing part 23 of the microcomputer 17 computes the q-axis current command value Iq*_up for reinforcing the assist torque in the steering direction (assist reinforcement control).

Specifically, when the assist torque can be reinforced in the steering direction by increasing the amount of current, the speed of the rotation of the motor 12 is increased by reinforcing the assist torque. Then, the velocity of entry ωin into the deceleration section is increased to prevent the occurrence of the stuck steering wheel.

The larger the difference between the rotational angular velocity ω and the critical velocity ωcr (|ωcr−ω|), that is, the more significantly the rotational angular velocity ω falls below the critical velocity ωcr, the more the current command value computing part 23 increases the absolute value of the q-axis current command value Iq*_up. Consequently, the occurrence of the stuck steering wheel can be prevented effectively and the assist power can be applied more stably.

When the steering direction does not match the rotational direction of the motor 12 and the rotational angle θ of the motor 12 is within the current restriction range during the two phase drive, the current command computing part 23 computes the q-axis current command value Iq*_dw for generating an assist torque in the direction opposite to the steering direction (inverse assist control).

When the velocity of entry ωin to the deceleration section is equal to or lower than the critical velocity ωcr, the motor 12 rotates inversely in the return direction in any section of the deceleration section. At this moment, however, the motor 12 rotates significantly inversely in the return direction from the position of entry into the deceleration section, by assisting the inverse rotation of the motor 12 or accelerating the rotation in the inverse direction by applying the inverse assist. Then, the steering system is twisted by the inverse rotation, and the resultant large assist power accelerates the rotation in the steering direction again. As a result, the velocity of entry ωin that is higher than that obtained upon the previous entry can be achieved and the deceleration section can be passed. Therefore, according to the above configuration, not only is it possible to prevent the occurrence of the stuck steering wheel effectively, but also it is possible to apply a more stable assist power.

When the rotational angle θ of the motor 12 is within the current restriction range and the motor 12 stops rotating (rotational angular velocity ω=0) during the two phase drive, the current command value computing part 23 executes the inverse assist control.

Specifically, the assist torque cannot be reinforced within the current restriction range (because there is no room to increase the amount of current at the time of current restriction), and also the reaction torque in the return direction is greater than the steering torque in the deceleration section. Therefore, as in the above configuration, the rotation of the motor 12 can be accelerated more effectively by executing the inverse assist control.

Next, a second embodiment in which the invention is embodied into the EPS is described with reference to the drawings.

The only main difference between this embodiment and the first embodiment is the aspect of the acceleration control that is performed for preventing the occurrence of the stuck steering wheel during low-speed steering, the stuck steering wheel being caused by the current restriction. Therefore, for convenience of explanation, the same reference numerals are used for the parts same as those of the first embodiment, and the explanation of these parts are omitted.

In this embodiment, as the acceleration control that is performed for preventing the occurrence of the stuck steering wheel during low-speed steering, the stuck steering wheel being caused by the current restriction, only the inverse assist control is performed when the steering direction does not match the rotational direction of the motor 12 (see FIG. 14). This invention is characterized in the aspect of this inverse assist control.

Figure 15:
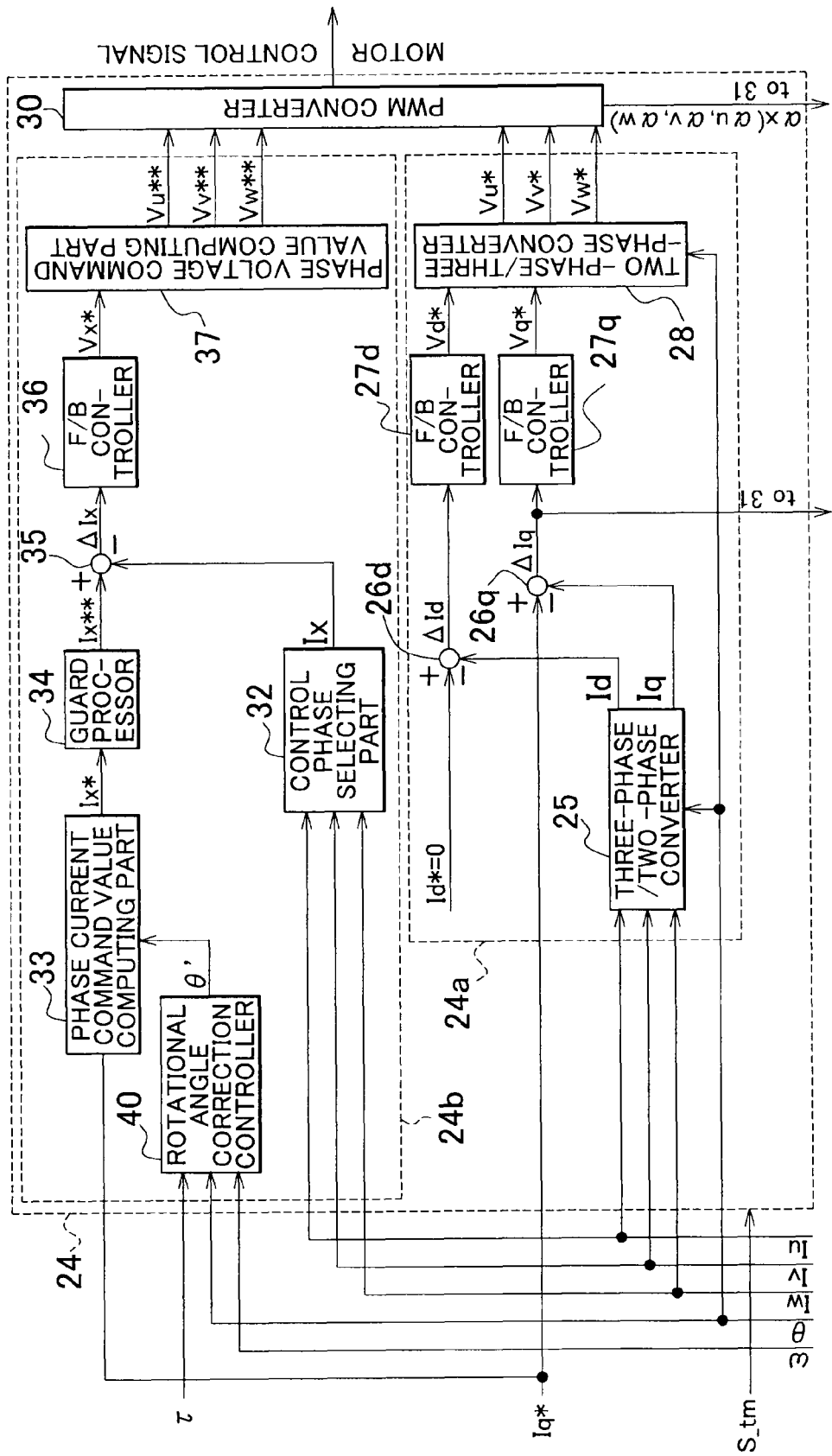
FIG. 15 is a control block diagram of a microcomputer (a motor control signal generating part) of a second embodiment.

More specifically, as shown in FIG. 15, in this embodiment the second current controller 24b that executes the phase current feedback control during the two phase drive is provided with a rotational angle correction controller 40 for correcting the rotational angle θ of the motor 12 that is input to the second current controller 24b. The rotational angle θ, the steering torque τ and the rotational angular velocity ω are input to this rotational angle correction controller 40. The rotational angle correction controller 40 then corrects the rotational angle θ on the basis of the levels of these values and outputs the corrected rotational angle θ' to the phase current command value computing part 33.

In this embodiment, unlike the first embodiment, special (for assist reinforcement or inverse assist) q-axis current command value Iq*_up, Iq*_dw used for executing the acceleration control in the current command value computing part 23 is not performed. In other words, the current command value computing part 23 outputs the q-axis current command value Iq* for the normal state at all times. In this embodiment, the inverse assist control is executed by correcting the rotational angle θ in the rotational angle correction controller 40.

Figure 16A:
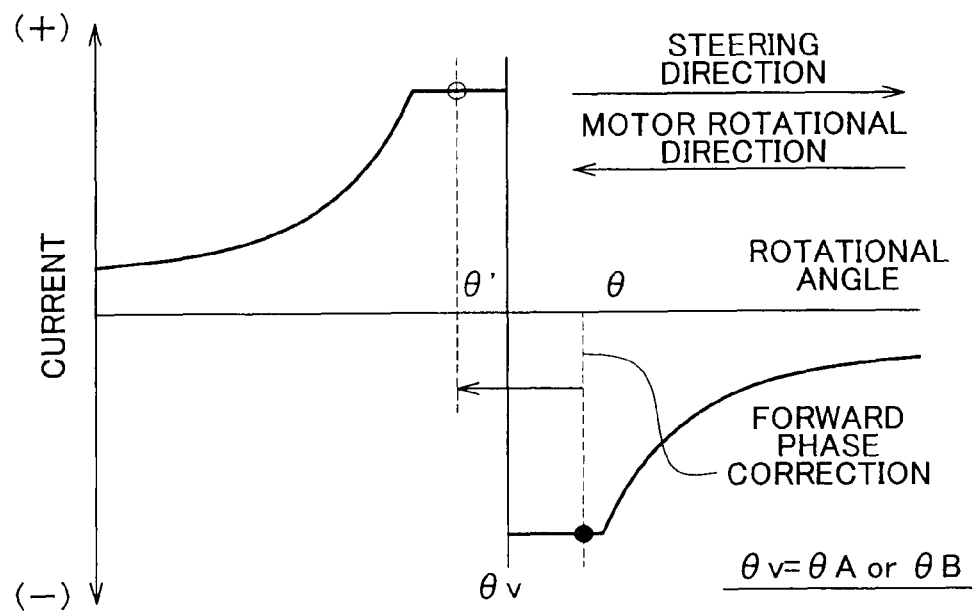
FIGS. 16A and 16B are principle explanatory diagrams of inverse assist provided by performing phase correction control.
Figure 16B:
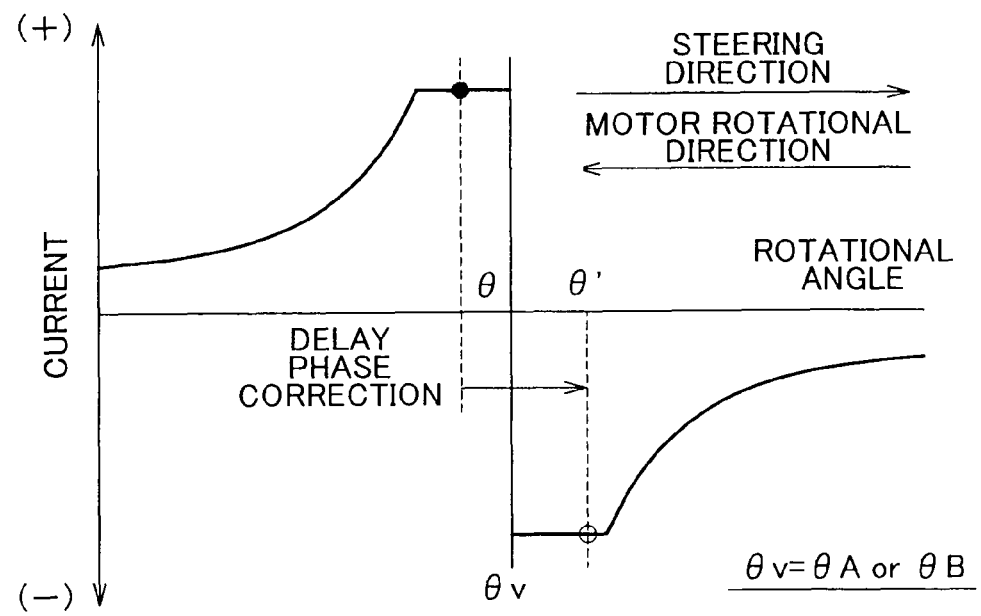
Figure 17:
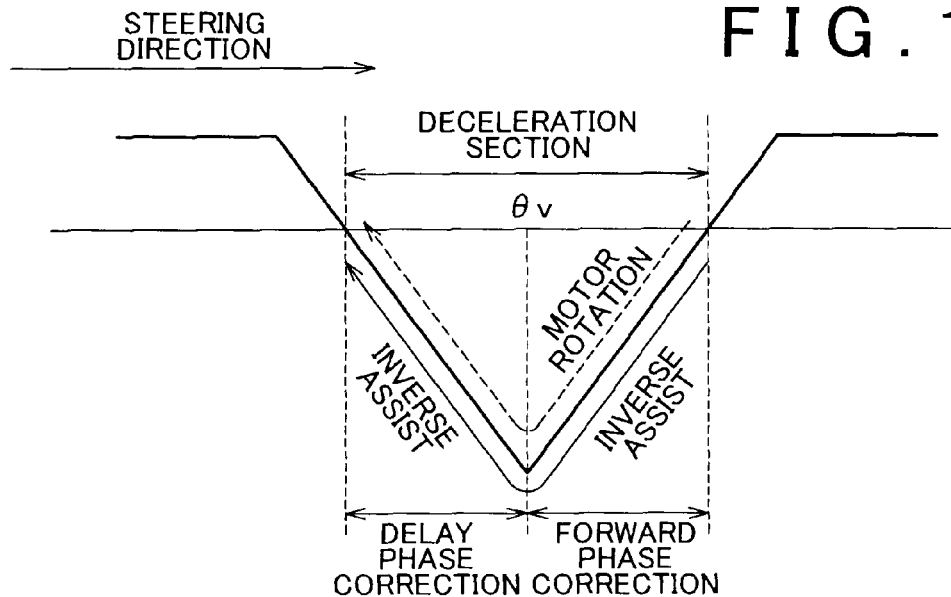
FIG. 17 is an explanatory diagram showing an aspect of inverse assist control performed by correcting phases.

Specifically, as shown in FIGS. 16A and 16B, during the two phase drive, the direction of each phase current is inverted, with a predetermined rotational angle θv corresponding to the asymptotic line being placed between the rotational angle and the corrected rotational angle. θv is θA or θB shown in FIG. 5. Therefore, the phase of the rotational angle θ is shifted so that the predetermined rotational angle θv is placed between the original rotational angle θ and the corrected rotational angle θ'. In other words, the phase is brought forward (see FIG. 16A) or delayed (see FIG. 16B). As a result, a current flowing in the direction opposite to the direction of the current corresponding to the original rotational angle θ can be applied. Also, in this embodiment, when the steering direction does not match the rotational direction of the motor 12, the inverse assist control is executed for generating an assist torque in a direction opposite to the steering direction (see FIG. 17).

Figure 18:
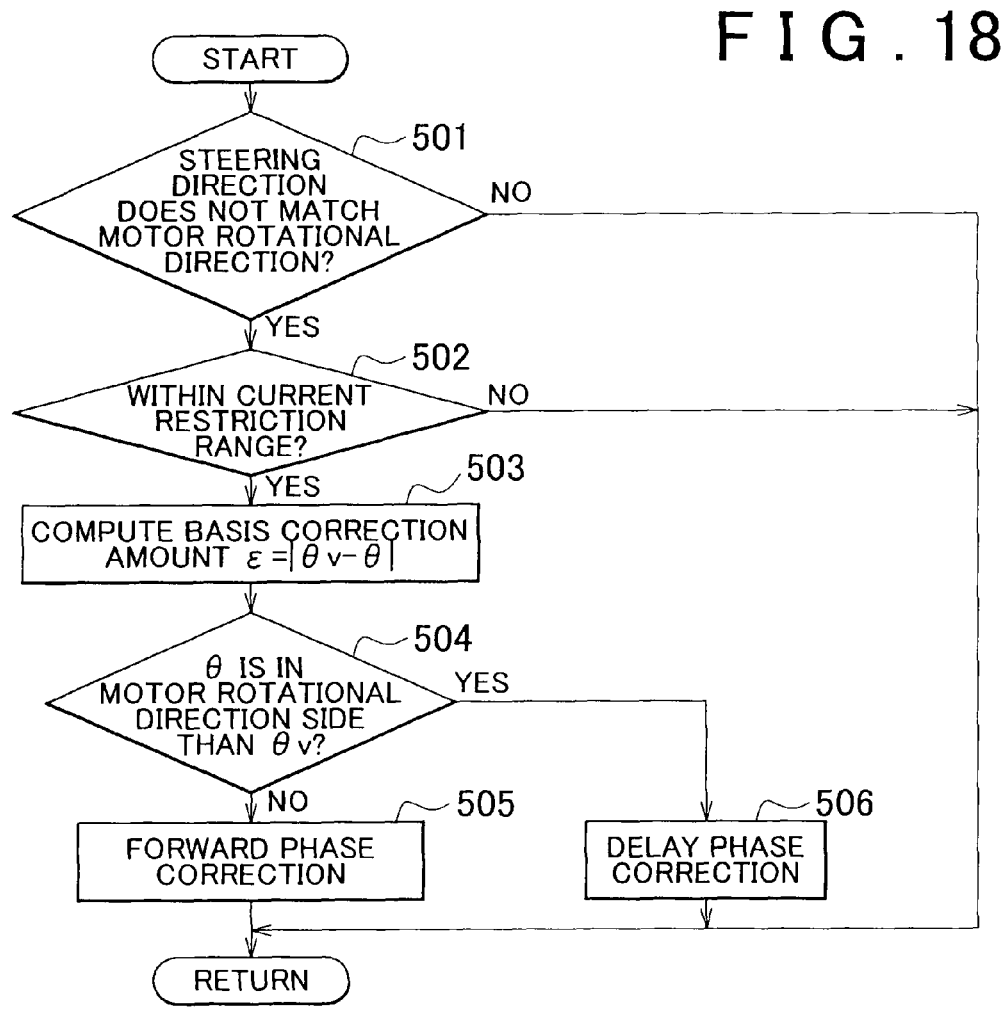
FIG. 18 is a flowchart showing a procedure of the inverse assist control performed by correcting phase.

More specifically, as shown in the flowchart of FIG. 18, the rotational angle correction controller 40 first determines whether the steering direction matches the motor rotational direction (step 501). When they do not match (step 501: YES), the rotational angle correction controller 40 then determines whether the rotational angle θ is within the current restriction range (θ1<θ<θ2, θ3<θ<θ4) (step 502). When it is determined that the rotational angle θ is within the current restriction range (step 502: YES), the rotational angle correction controller 40 then computes the difference (absolute value) between the rotational angle θ and the predetermined rotational angle θv corresponding to the asymptotic line (see FIGS. 16A and 16B) on the basis of a basis correction amount ε used for executing the phase correction control (ε=|θv−θ|, step 503).

The determination on the rotational angle that is performed in step 501 is executed based on whether the sign of the steering torque τ matches the sign of the rotational angular velocity ω of the motor 12. The rotational angle correction controller 40 determines that the steering direction does not match the motor rotational direction even when the motor 12 is stopped (rotational angular velocity ω=0). The reason that the difference between the present rotational angle θ and the predetermined rotational angle θv is computed based on the basis correction amount ε in step 502 is because, basically, the rotational angle can be corrected to the position where the current direction is inverted, by bringing a phase of the rotational angle forward or delaying the phase of the rotational angle from the present rotational angle θ by the difference (+margin). When it is determined in step 501 that the steering direction matches the motor rotational direction (step 501: NO) or when it is determined in step 502 that the rotational angle θ is not within the current restriction range (step 502:

NO), the rotational angle correction controller 40 does not execute the processes of step 503 to step 504 described hereinafter.

Next, the rotational angle correction controller 40 determines whether the present rotational angle θ is closer to the motor rotational direction side than the predetermined rotational angle θv, that is, whether the rotational angle θ is on the inverse rotational direction in relation to the steering direction (step 504). In this step 504, "the rotational angle θ is not in the motor rotational direction (step 504: NO)" means that the rotational angle θ is on the near side from the predetermined rotational angle θv, and "the rotational angle θ is in the motor rotational direction (step 504: YES)" means that the rotational angle θ is on the far side from the predetermined rotational direction θv towards the motor rotational direction. In other words, when the present rotational angle θ is smaller than the predetermined rotational angle θv, the rotational angle correction controller 40 determines that the present rotational angle θ is not in the motor rotational direction in relation to the predetermined rotational angle θv. When the present rotational angle θ is larger than the predetermined rotational angle θv, the rotational angle correction controller 40 determines that the present rotational angle θ is in the motor rotational direction in relation to the predetermined rotational angle θv. When the rotational angle θ is not in the motor rotational direction (step 504: NO), the rotational angle correction controller 40 executes forward phase control for bringing the phase of the corrected rotational angle θ' forward (step 505, see FIG. 16A). When the rotational angle θ is in the motor rotational direction (step 504: YES), the rotational angle correction controller 40 executes delay phase control for delaying the rotational angle θ with respect to the motor rotational direction (step 506, see FIG. 16B).

According to this embodiment, the following operational effects can be achieved. The second current controller 24b is provided with the rotational angle correction controller 40 for correcting the rotational angle θ of the motor 12 that is input to the second current controller 24b. When the steering direction does not match the motor rotational direction, the rotational angle correction controller 40 shifts the phase of the rotational angle θ so that the predetermined rotational angle θv is placed between the rotational angle θ and the corrected rotational angle θ'. Specifically, the rotational angle correction controller 40 brings the phase forward (see FIG. 16A) or delays the phase (see FIG. 16B).

Specifically, during the two phase drive, the direction of each phase current is inverted, with the predetermined rotational angle θv corresponding to the asymptotic line being placed between the rotational angle and the corrected rotational angle. Therefore, the inverse assist control for preventing the occurrence of the stuck steering wheel can be executed with such a simple configuration.

The rotational angle correction controller 40 computes the difference (absolute value) between the rotational angle θ and the predetermined rotational angle θv corresponding to the asymptotic line (see FIGS. 16A and 16B) on the basis of the basis correction amount ε used for executing the phase correction control.

Basically, the rotational angle is corrected to the position where the current direction is inverted, by bringing the phase of the rotational angle forward or delaying the phase of the rotational angle from the present rotational angle θ by the difference (+margin). Therefore, according to the above configuration, the phase compensation control is executed more precisely so that more effective the inverse assist control can be executed.

Note that each of the embodiments may be changed as follows.

In each of the above embodiments, the ECU 11 serving as the motor control device has three control modes: "normal control mode", "assist suspension mode", and "two phase drive mode." However, the modes for executing the motor control upon occurrence of an abnormality are not limited to these three modes. Specifically, any mode is possible as long as the motor control is executed with two electrification phases other than the phase with an electrification failure, when an electrification failure occurs. Moreover, the method for detecting (determining) an abnormality is also not limited to the configurations of the embodiments.

In each of the above embodiments, the current command value computing part 23 outputs a phase current command value for one of the two phases other than the phase with an electrification failure during the two phase drive. The motor control signal generating part 24 computes a phase voltage command value for the phase and then computes phase voltage command values for the other phases on the basis of the former phase voltage command value. However, the current command value computing part 23 may output phase current command values for both of the two phases other than the phase with an electrification failure.

Furthermore, in each of the above embodiments, the phase current command value Iv* of the V phase is computed when an abnormality occurs in the U phase or the W phase, and the phase current command value Iu* of the U phase is computed when an abnormality occurs in the V phase, on the basis of the above equations (1) to (3). However, the phase current command value (Iw*) of the W phase may be computed when an abnormality occurs in the U phase or the V phase, and the phase current command value (Iu*) of the U phase may be computed when an abnormality occurs in the W phase. Note that each of the phase current command values can be computed by inverting the signs shown in the equations (1) to (3).

Moreover, each phase current command value that is computed upon the occurrence of an electrification abnormality does not have to be completely the same as that computed by the equations (1) to (3). In other words, the effects of the embodiments can be still obtained even when the phase current command value changes in the form of a rough secant curve or a rough cosecant curve on the basis of an asymptotic line, which is the predetermined rotational angle, or when computing the phase current command value that changes in the similar form. However, when the phase current command value is computed based on the above equations (1) to (3), the motor current closes to the request torque can be generated, and more remarkable effects can be obtained by the method for computing a value closed to the phase current command value computed based on each of the equations.

In the first embodiment, both the assist reinforcement control and the inverse assist control are executed as the acceleration control for preventing the occurrence of the stuck steering wheel during low-speed steering that is generated by the execution of the current restriction. However, only either one of the assist reinforcement control and the inverse assist control may be executed.

In the first embodiment, when the steering direction does not match the rotational direction of the motor 12, it means that the motor 12 is stopped (ω=0). Therefore, as with the case where the motor 12 rotates inversely, the q-axis current command value Iq*_dw is computed by multiplying the correction coefficient K2 by the initially computed q-axis current command value Iq* (see FIG. 12, step 407). However, the correction coefficient obtained when the motor 12 is stopped (ω=0) may be different from the correction coefficient obtained when the motor 12 rotates inversely.

In the second embodiment, both the forward phase correction and the delay phase correction are executed as the phase compensation control for executing the inverse assist control (see FIG. 18). However, only either one of the forward phase correction and the delay phase correction may be performed.

In the second embodiment, as the basis correction amount ε used for executing the phase correction control, the rotational angle correction controller 40 computes the difference (absolute value) between the rotational angle θ and the predetermined rotational angle θv corresponding to the asymptotic line. However, the phase correction amount may be a fixed value.

In the second embodiment, the rotational angle correction controller 40 is provided in the second current controller 24b, but it may be provided outside the second current controller 24b. In this case, when determination process similar to that of the first embodiment is executed to perform the inverse assist control (see FIG. 12, step 407), the q-axis current command value may be computed using the rotational angle θ' obtained as a result of the phase correction, instead of multiplying the correction coefficient K2, so that the inverse assist control is realized.

In each of the above embodiments, when executing the inverse assist control, it is determined whether the rotational angle θ is within the current restriction range (see FIG. 12, step 406, and see FIG. 18, step 502). Although this determination is a process for avoiding the inverse rotation where an inverse input is applied from a turning wheel when hitting a curb or the like, this determination is not necessarily performed.

In the first embodiment, the assist reinforcement control (step 405) is executed when the rotational angular velocity ω is equal to or lower than the critical velocity ωcr (see FIG. 12, step 403: NO) and the rotational angle θ does not fall within the current restriction range (step 404: NO). However, when the rotational angle θ falls within the current restriction range, the determination processing for determining whether the rotational angle θ falls within the current restriction range (step 404) may be omitted, as it is impossible to increase the amount of current.

Figure 19:
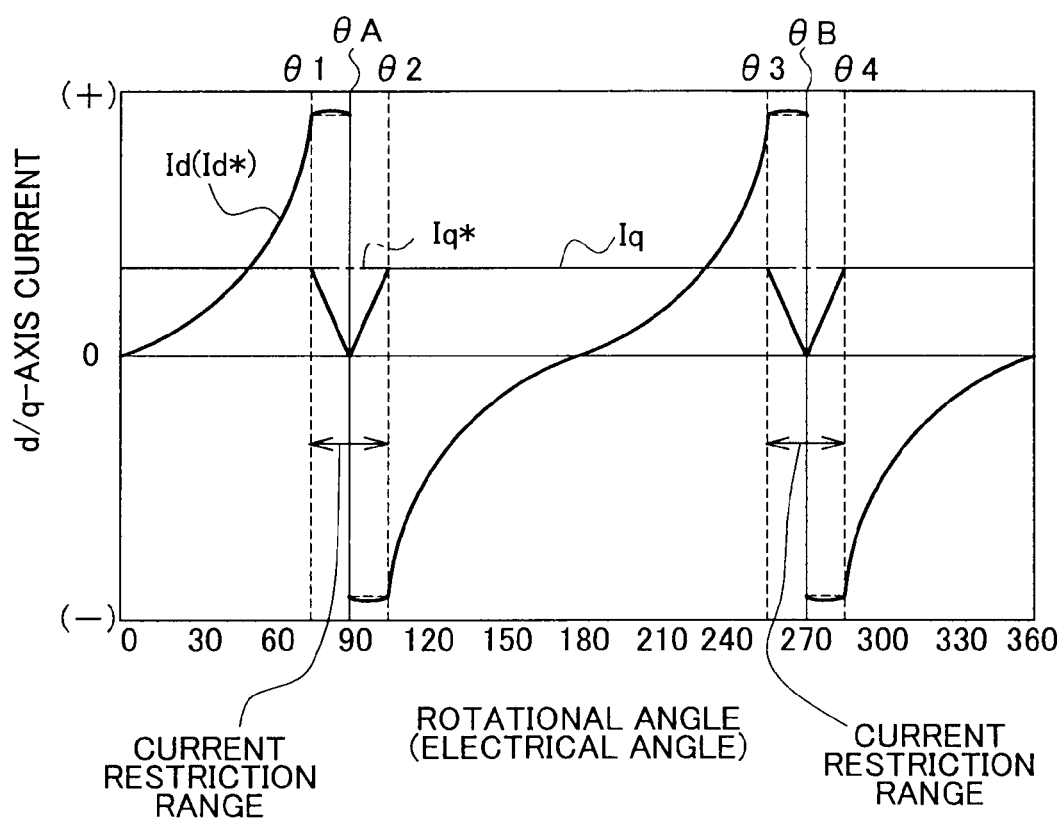
FIG. 19 is an explanatory diagram showing how a d-axis current and q-axis current change during two phase drive (when the U phase has an electrification failure) in another example.
Figure 20:
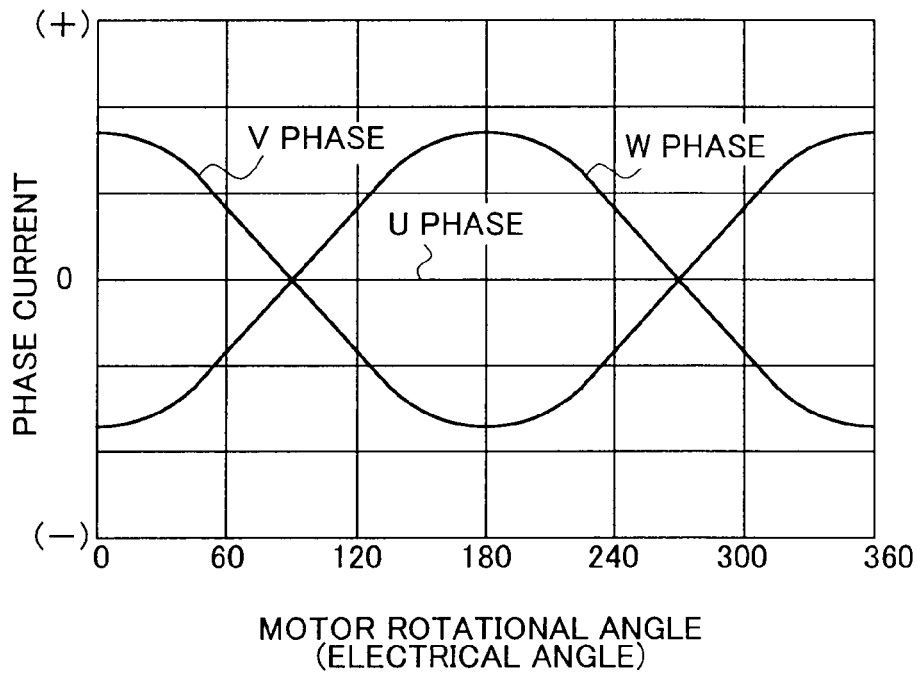
FIG. 20 is an explanatory diagram of a related technical field, showing an aspect of two phase drive that is performed with two electrification phases other than a phase having an electrification failure.
Figure 21:
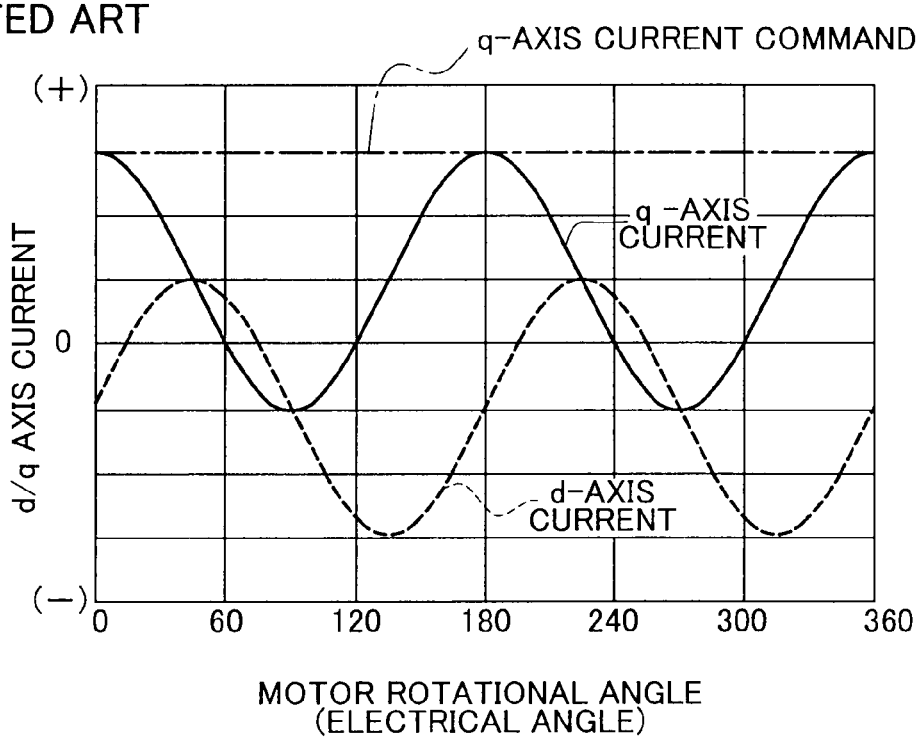
FIG. 21 is an explanatory diagram of the related technical field, showing how a d-axis current and q-axis current change during two phase drive.

In addition, the mode of current control may not be necessarily the phase current feedback control performed in the three-phase AC coordinate system (U, V, W) of each of the embodiments. For example, the d-axis current command value Id* is computed using the following equations (6) to (8), the d-axis current command value Id* changing in the form of a tangent curve on the basis of asymptotic lines that are the predetermined rotational angles θA, θB corresponding to the phase having an electrification failure. Then, the motor control signal may be generated by executing the current feedback control of the d/q coordinate system on the basis of the computed d-axis current command value Id* (see FIG. 19 showing an example where the U phase has an electrification failure). Moreover, the motor control signal may be output by executing, not only the feedback control, but also open control.

When the U phase has an electrification failure:

$$I_d^* = I_q^* \frac{\sin\theta}{\cos\theta} = I_q^* \tan\theta \qquad (6)$$

When the V phase has an electrification failure:

$$I_d^* = -I_q^* \frac{\sin(\theta + \frac{\pi}{3})}{\sin(\theta - \frac{\pi}{6})} = I_q^* \tan\left(\theta - \frac{2\pi}{3}\right) \qquad (7)$$

When the W phase has an electrification failure:

$$I_d^* = -I_q^* \frac{\sin(\theta + \frac{\pi}{3})}{\sin(\theta + \frac{\pi}{6})} = I_q^* \tan\left(\theta + \frac{2\pi}{3}\right) \qquad (8)$$

What is claimed is:

1. An electric power steering device, comprising:
a steering force assisting device having a motor that functions as a drive source and providing a steering system with an assist power for assisting a steering operation; and
a control device that controls an operation of the steering force assisting device through a supply of a drive power to the motor, the control device comprising:
  a motor control signal output part that outputs a motor control signal;
  a drive circuit that supplies the drive power of three phases to the motor on the basis of the motor control signal; and
  an abnormality detecting part that detects an electrification failure caused in each of the phases of the motor,
wherein:
the motor control signal output part generates the motor control signal by executing current control on the basis of a rotational angle of the motor and, upon occurrence of the electrification failure, executes output of the motor control signal by means of two electrification phases other than a phase with the electrification failure;
upon occurrence of the electrification failure, the motor control signal output part executes the current control for applying each of the electrification phases with a phase current that changes in the form of a secant curve or a cosecant curve based on an asymptotic line, which is a line on which a predetermined rotational angle corresponding to the phase with the electrification failure is constant;
the motor control signal output part executes current restriction for restricting the phase current within a predetermined range; and
the motor control signal output part executes acceleration control for accelerating rotation of the motor, in order to prevent the rotation of the motor from stopping as a result of the current restriction.

2. The electric power steering device according to claim 1, wherein, when a direction of the steering operation matches a rotational direction of the motor and a rotational angular velocity of the motor is equal to or lower than a critical velocity at which the motor stops rotating, during two phase drive performed due to the occurrence of the electrification failure, the motor control signal output part executes assist reinforcement control for reinforcing an assist torque in the direction of the steering operation.

3. The electric power steering device according to claim 2, wherein the motor control signal output part executes the assist reinforcement control such that the assist torque increases as the rotational angular velocity of the motor falls below the critical velocity by a large amount.

4. The electric power steering device according to claim 1, wherein, when the motor stops rotating and the rotational angle thereof falls within a range in which the current restriction is performed, during two phase drive performed due to the occurrence of the electrification failure, the motor control signal output part executes inverse assist control for generating an assist torque for rotating the motor in a direction opposite to the direction of the steering operation.

5. The electric power steering device according to claim 1, wherein, when a direction of the steering operation does not match a rotational direction of the motor during two phase drive performed due to the occurrence of the electrification failure, the motor control signal output part executes inverse assist control for generating an assist torque for rotating the motor in a direction opposite to the direction of the steering operation.

6. The electric power steering device according to claim 5, wherein the inverse assist control is executed when the rotational angle of the motor falls within a range in which the current restriction is performed.

7. The electric power steering device according to claim 5, wherein the inverse assist control is executed by correcting the rotational angle of the motor.

8. The electric power steering device according to claim 7, wherein the rotational angle is corrected by shifting a phase of the rotational angle so that the predetermined rotational angle corresponding to the asymptotic line is placed between the rotational angle and a corrected rotational angle.

9. The electric power steering device according to claim 7, wherein the rotational angle is corrected based on a difference between the rotational angle and the predetermined rotational angle corresponding to the asymptotic line.

10. A control method of an electric power steering device which has a steering force assisting device having a motor that functions as a drive source and providing a steering system with an assist power for assisting a steering operation, and which controls an activation of the steering force assisting device through a supply of a drive power to the motor, the method comprising:
   outputting a motor control signal by executing current control on the basis of a rotational angle of the motor;
   supplying the drive power of three phases to the motor on the basis of the motor control signal;
   detecting an electrification failure caused in each of the phases of the motor;
   executing, upon occurrence of the electrification failure, the current control for applying each of the electrification phases with a phase current that changes in the form of a secant curve or a cosecant curve based on an asymptotic line, which is a line on which a predetermined rotational angle corresponding to a phase with the electrification failure is constant;
   executing current restriction for restricting the phase current within a predetermined range; and
   executing acceleration control for accelerating rotation of the motor, in order to prevent the rotation of the motor from stopping as a result of the current restriction.

11. A control device of an electric power steering device which has a steering force assisting device having a motor that functions as a drive source and providing a steering system with an assist power for assisting a steering operation, and which controls activation of the steering force assisting device through a supply of a drive power to the motor, the control device comprising:
   a motor control signal output part that outputs a motor control signal;
   a drive circuit that supplies the drive power of three phases to the motor on the basis of the motor control signal; and
   an abnormality detecting part that detects an electrification failure caused in each of the phases of the motor, wherein:
   the motor control signal output part generates the motor control signal by executing current control on the basis of a rotational angle of the motor and, upon occurrence of the electrification failure, executes output of the motor control signal by means of two electrification phases other than a phase with the electrification failure;
   upon occurrence of the electrification failure, the motor control signal output part executes the current control for applying each of the electrification phases with a phase current that changes in the form of a secant curve or a cosecant curve based on an asymptotic line, which is a line on which a predetermined rotational angle corresponding to the phase with the electrification failure is constant;
   the motor control signal output part executes current restriction for restricting the phase current within a predetermined range; and
   the motor control signal output part executes acceleration control for accelerating rotation of the motor, in order to prevent the rotation of the motor from stopping as a result of the current restriction.

* * * * *

UNITED STATES PATENT AND TRADEMARK OFFICE
CERTIFICATE OF CORRECTION

| | | |
|---|---|---|
| PATENT NO. | : 8,160,777 B2 | Page 1 of 1 |
| APPLICATION NO. | : 12/273881 | |
| DATED | : April 17, 2012 | |
| INVENTOR(S) | : Terutaka Tamaizumi | |

It is certified that error appears in the above-identified patent and that said Letters Patent is hereby corrected as shown below:

On the title page, Item (30), the Foreign Application Priority Data information is missing. Item (30) should read:

--(30) Foreign Application Priority Data

Nov. 20, 2007 (JP).......................... 2007-300667--

Signed and Sealed this
Fifth Day of June, 2012

David J. Kappos
*Director of the United States Patent and Trademark Office*